(12) United States Patent
Ono

(10) Patent No.: US 12,395,933 B2
(45) Date of Patent: Aug. 19, 2025

(54) COMMUNICATION APPARATUS, CONTROL METHOD, AND NON-TRANSITORY COMPUTER-READABLE STORAGE MEDIUM STORING PROGRAM

(71) Applicant: CANON KABUSHIKI KAISHA, Tokyo (JP)

(72) Inventor: Kaede Ono, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 617 days.

(21) Appl. No.: 17/837,276

(22) Filed: Jun. 10, 2022

(65) Prior Publication Data
US 2022/0400436 A1 Dec. 15, 2022

(30) Foreign Application Priority Data
Jun. 14, 2021 (JP) ................................. 2021-098917

(51) Int. Cl.
*G08C 17/00* (2006.01)
*H04W 52/02* (2009.01)

(52) U.S. Cl.
CPC .............................. *H04W 52/0225* (2013.01)

(58) Field of Classification Search
CPC .................................................. H04W 52/0225
USPC ......................................................... 370/311
See application file for complete search history.

(56) References Cited

U.S. PATENT DOCUMENTS

| 2014/0378058 | A1* | 12/2014 | Decuir | H04W 4/80 |
| | | | | 455/41.2 |
| 2016/0286343 | A1* | 9/2016 | Terashita | H04W 4/80 |
| 2017/0192724 | A1* | 7/2017 | Kim | G06F 3/1229 |
| 2018/0096236 | A1* | 4/2018 | Bermundo | G06K 15/007 |
| 2020/0073602 | A1* | 3/2020 | Ueno | G06F 3/1236 |

FOREIGN PATENT DOCUMENTS

JP 2017-188869 A 10/2017

* cited by examiner

*Primary Examiner* — Temica M Beamer
(74) *Attorney, Agent, or Firm* — VENABLE LLP

(57) ABSTRACT

If it is determined that normal value is written in a predetermined area in data of a communication apparatus, a control unit shifts a state of the communication apparatus from a power saving state to a normal state, and if it is not determined that the normal value is written in the predetermined area, the control unit does not shift the state of the communication apparatus from the power saving state to the normal state.

17 Claims, 17 Drawing Sheets

FIG. 4

| Service UUID (401) | Service NAME (402) | Characteristic UUID (403) | Characteristic NAME (404) | Service READ ENABLE (405) | Service WRITE ENABLE (406) | Characteristic READ ENABLE (407) | Characteristic WRITE ENABLE (408) | Characteristic INDICATABLE (409) | VALUE (410) | PAIRING NEED (411) |
|---|---|---|---|---|---|---|---|---|---|---|
| 0x1801 | GATT Service | 0x2A05 | Service Changed | | | | | ○ | 0 | |
| | | 0x2B2A | Database Hash | | | ○ | | | F0 CA 2D 48 EC F5 8B AC 8A AA 30 BB B9 FB A9 90 | |
| 0x180A | Device Information | 0x2A29 | Manufacturer Name String | ○ | | ○ | | | Printer Device | |
| | | 0x2A24 | Hardware Revision String | | | ○ | | | 1010_AAA | |
| | | 0x2A25 | Firmware Revision String | | | ○ | | | 2030000 | |
| | | 0x2A26 | Firmware Revision String | | | ○ | | | 1 | |
| 00000000-0000-1000-1000-004059b34fb | IJ Original | 00000000-0000-2000-1000-004059b34fb | SSID | ○ | ○ | ○ | | | PrinterSS ID | ○ |
| | | 00000000-0000-2000-1000-004059b34fc | PASSWORD | ○ | ○ | ○ | ○ | | aaaabbbb | ○ |
| | | 00000000-0000-2000-1000-004059b34fd | APPARATUS NAME REGION | | | | | | 0 | ○ |

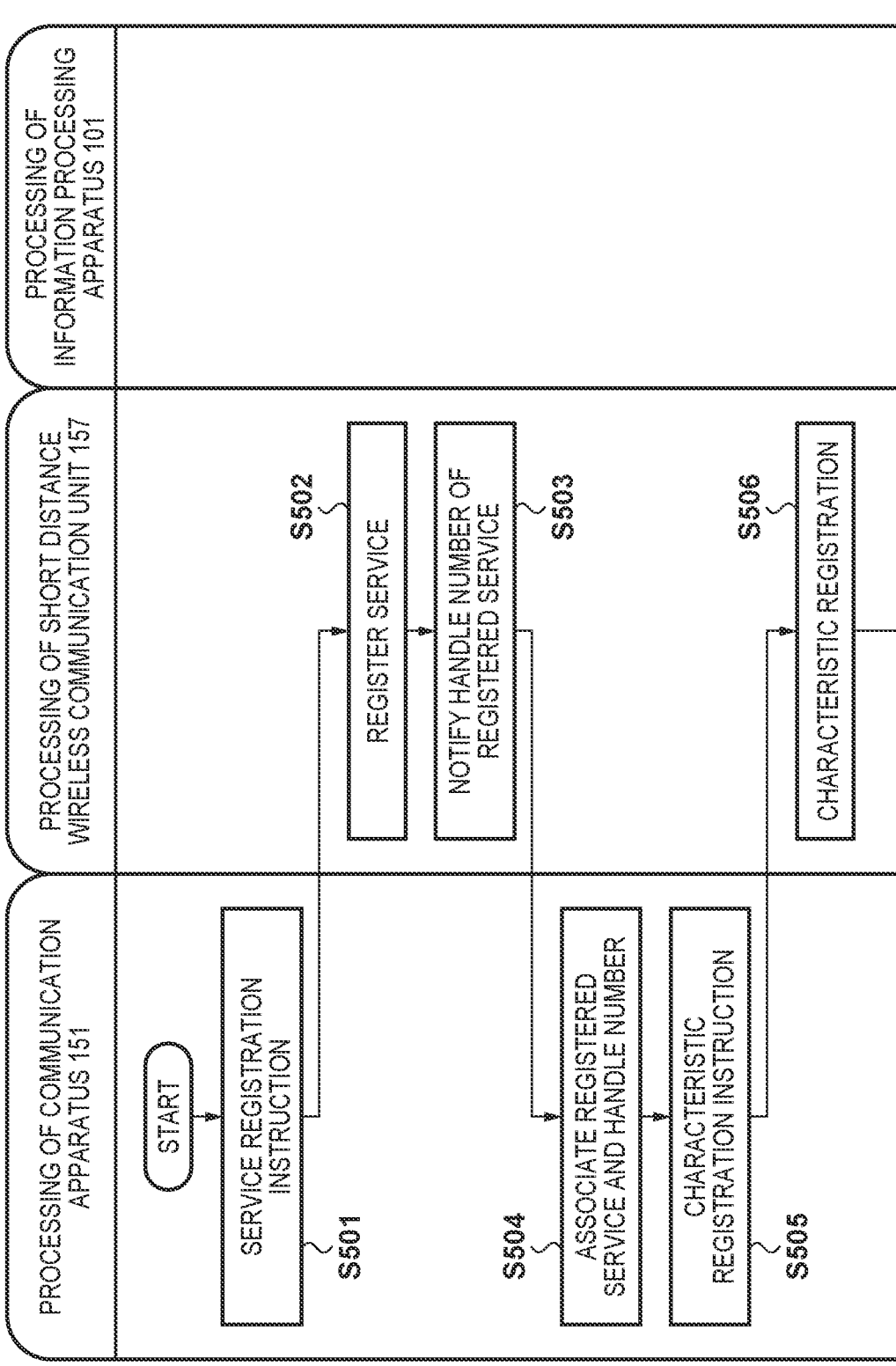

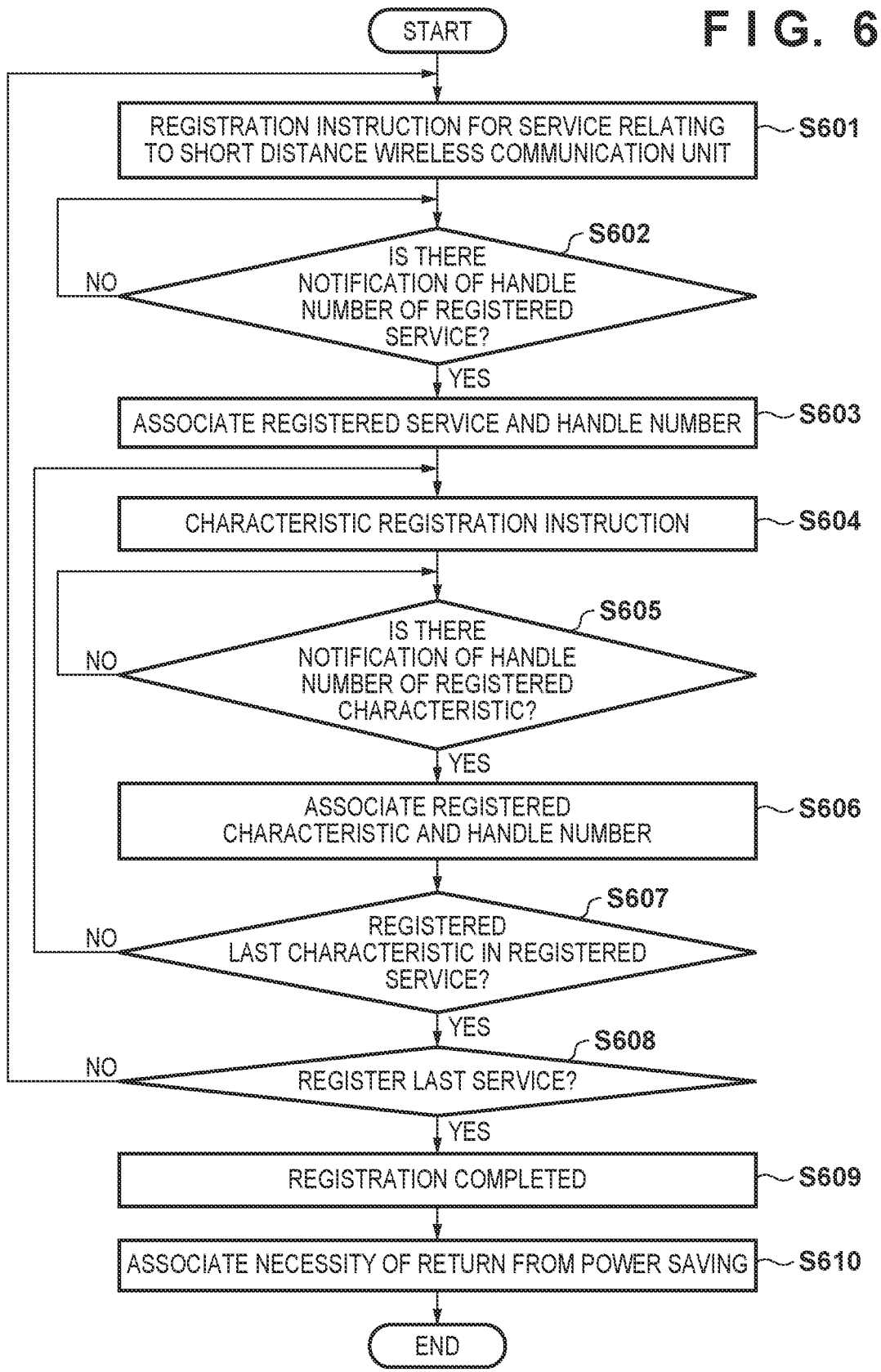

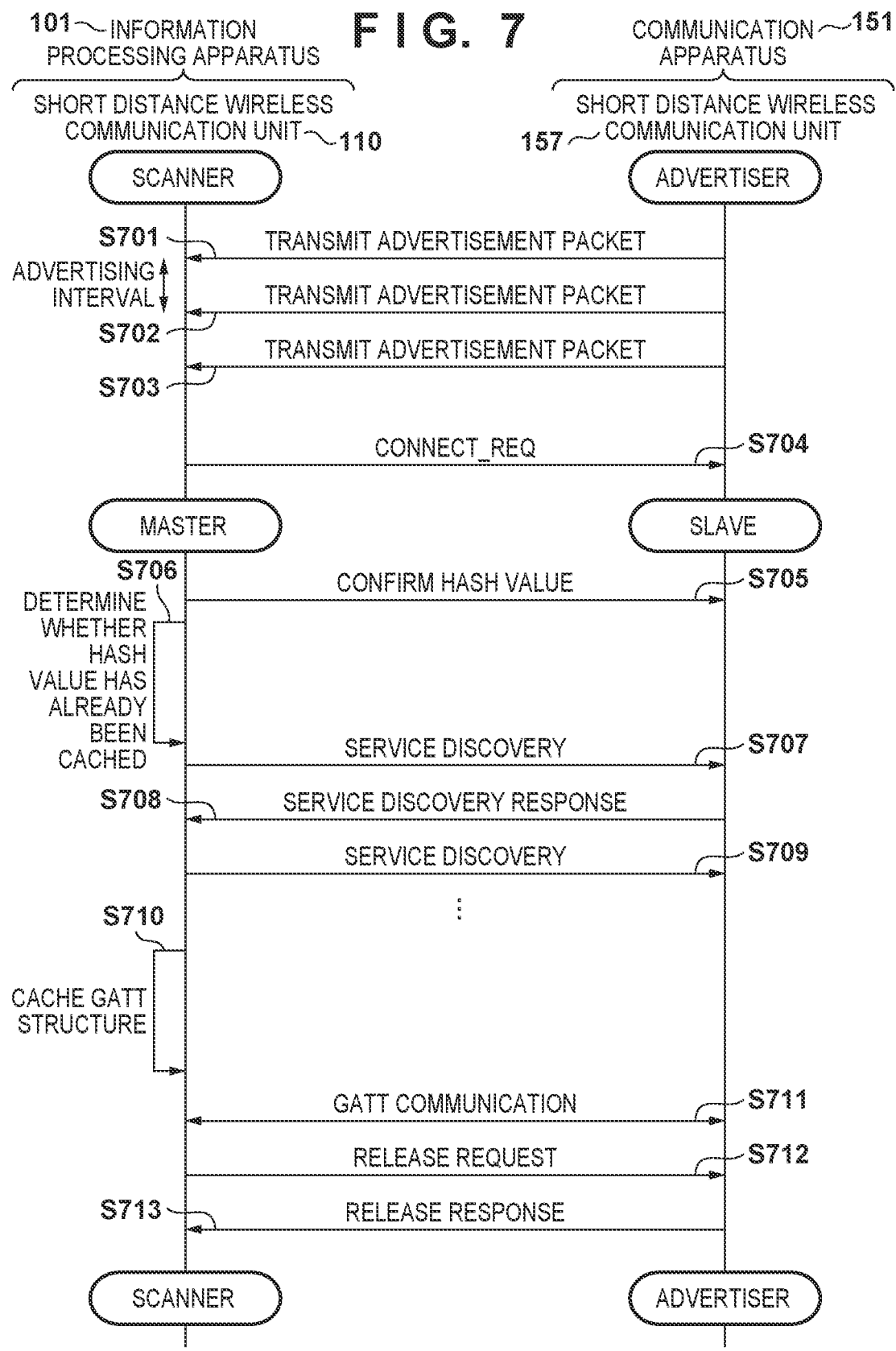

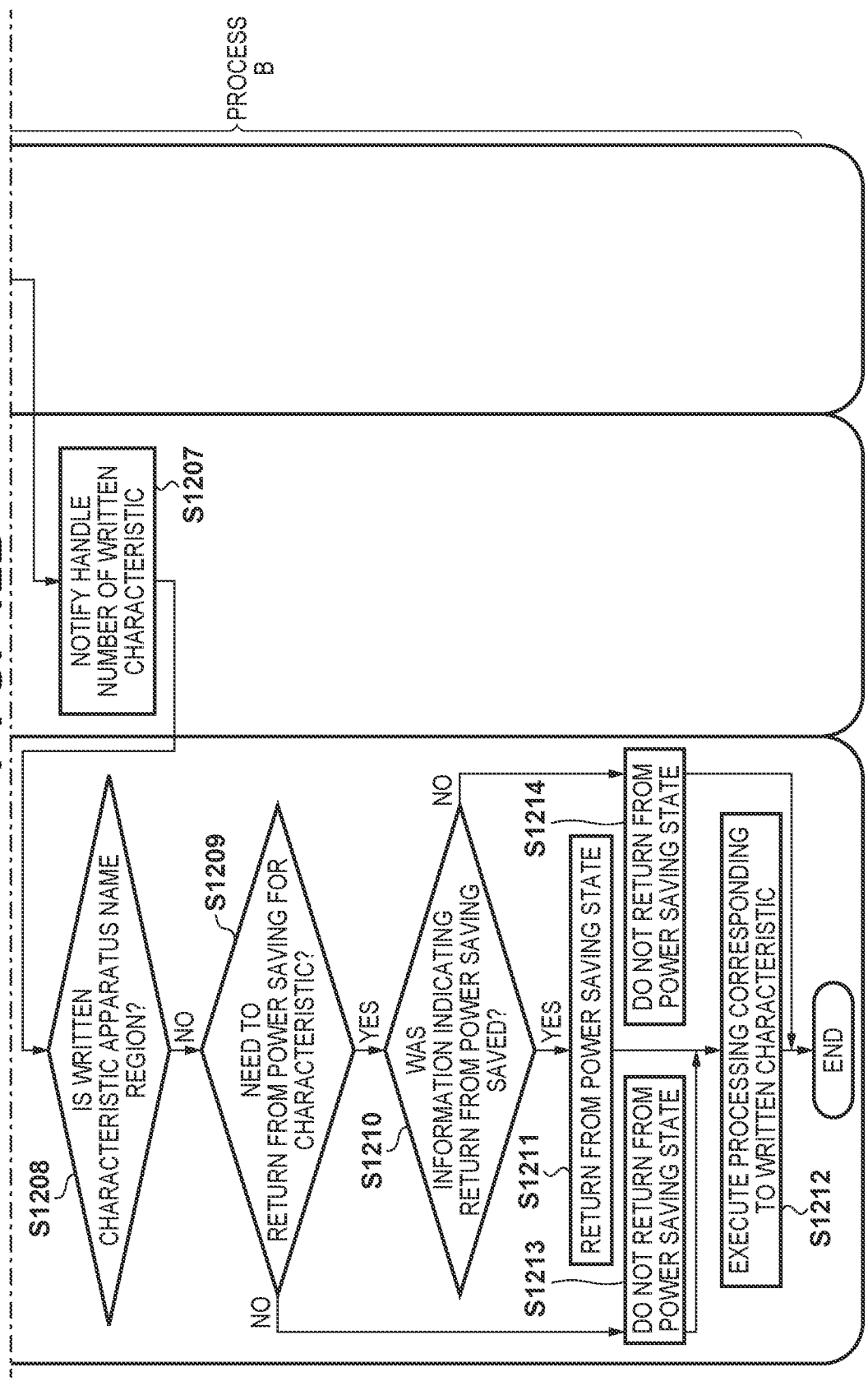

FIG. 13

| OFFSET | DESCRIPTION | | VALUE |
|---|---|---|---|
| 0 | HEADER PORTION | | 'S' |
| 1 | | | 'T' |
| 2 | | | 'A' |
| 3 | | | 'R' |
| 4 | | | 'T' |
| 5 | | | \0 |
| 6 | COMMAND PORTION | SIZE | 0x05 |
| 7 | | | 0x00 |
| 8 | | COMMAND | 'D' |
| 9 | | | 'D' |
| 10 | | | 'D' |
| 11 | | | 'D' |
| 12 | | | \0 |
| 13 | DATA PORTION | SIZE | 0x1d |
| 14 | | | 0x00 |
| 15 | | ARBITRARY DATA | ARBITRARY |
| 16 | | | ARBITRARY |
| ⋮ | | | |
| 42 | | | ARBITRARY |
| 43 | | | \0 |
| 44 | FOOTER PORTION | | 'E' |
| 45 | | | 'N' |
| 46 | | | 'D' |
| 47 | | | \0 |

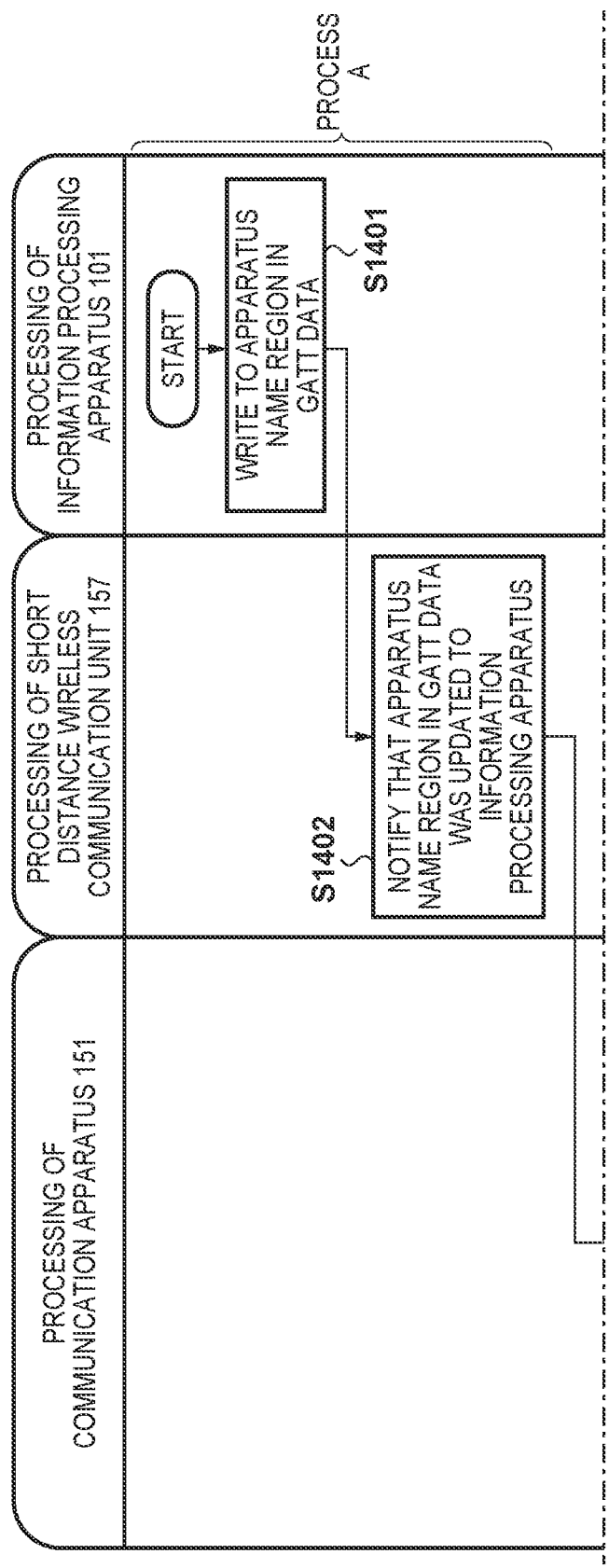

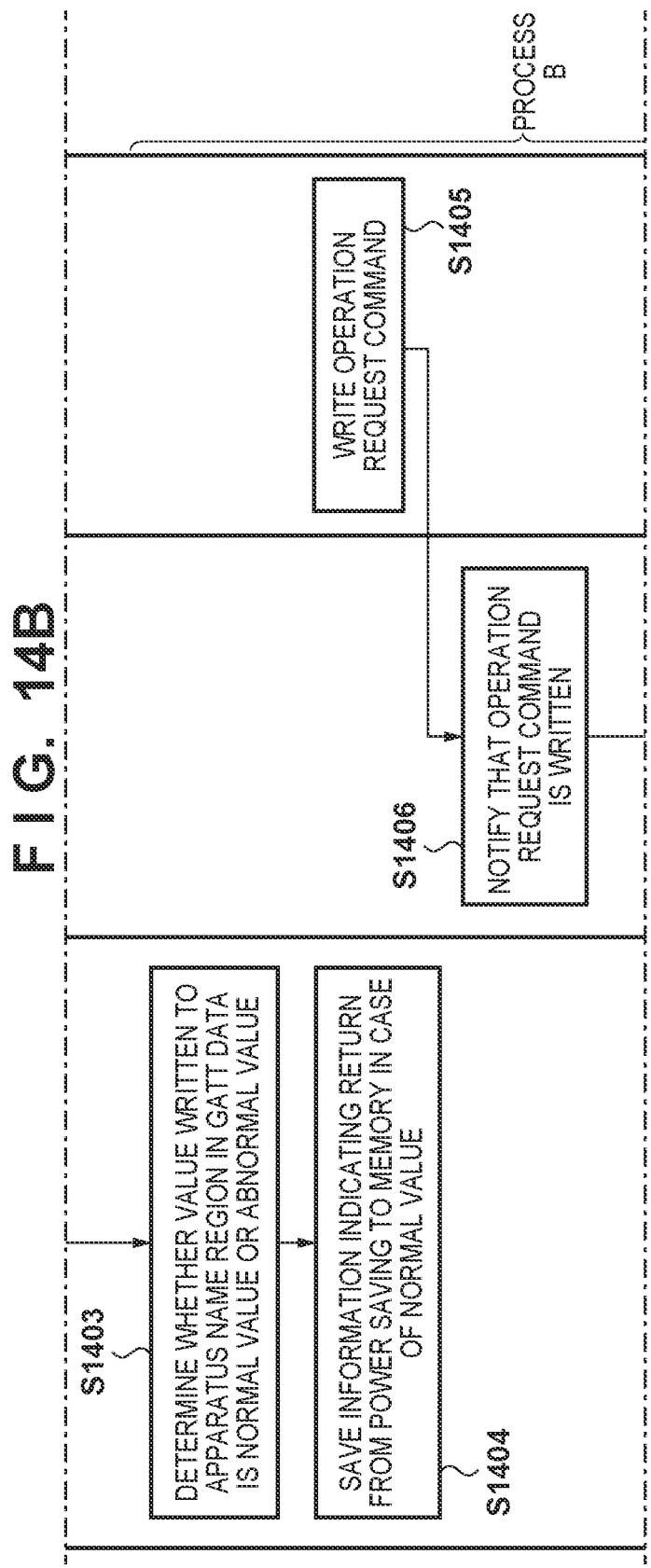

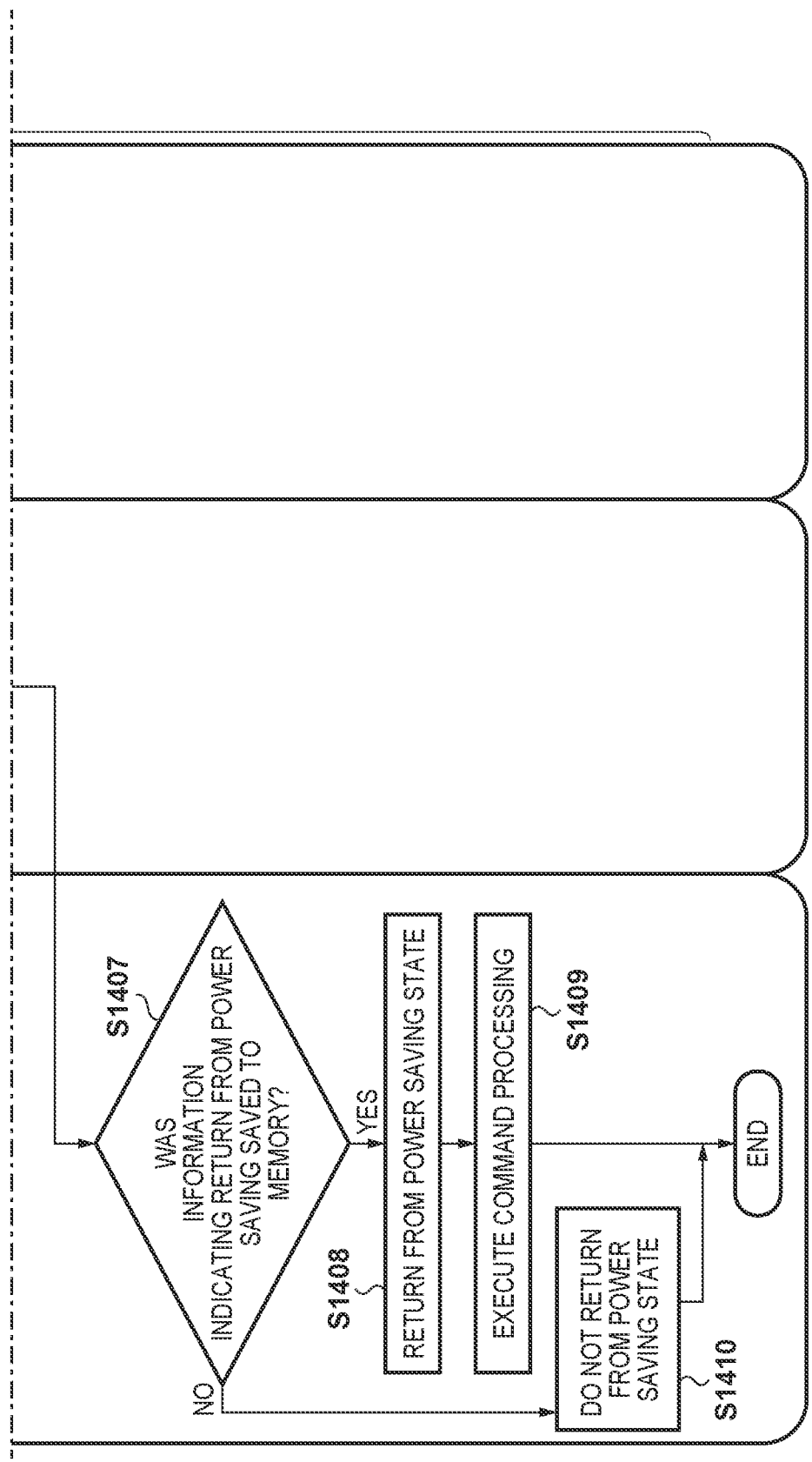

COMMUNICATION APPARATUS, CONTROL METHOD, AND NON-TRANSITORY COMPUTER-READABLE STORAGE MEDIUM STORING PROGRAM

BACKGROUND OF THE INVENTION

This application claims the benefit of Japanese Patent Application No. 2021-098917, filed Jun. 14, 2021, which is hereby incorporated by reference herein in its entirety.

Field of the Invention

The present invention relates to a communication apparatus having a plurality of power states, a control method of controlling the communication apparatus, and a non-transitory computer-readable storage medium storing a program.

Description of the Related Art

There is known an apparatus that performs communication by Bluetooth Low Energy® (to be referred to as BLE hereinafter). Japanese Patent Laid-Open No. 2017-188869 describes communication performed by BLE between an information processing apparatus such as a smartphone and a communication apparatus such as a printer.

On the other hand, it is known that a communication apparatus has a plurality of power states. The plurality of power states include, for example, a hardware off state in which the power is OFF and a software off state in which the power is ON but a main program is inactive. The plurality of power states further include, for example, a power saving state in which the main program is active but control is performed to suppress power consumption, and a normal active state in which a program is normally active.

SUMMARY OF THE INVENTION

The present invention provides a communication apparatus that appropriately controls the power state of the apparatus, a control method, and a non-transitory computer-readable storage medium storing a program.

The present invention in one aspect provides a communication apparatus comprising: a determination unit configured to determine, in a case that an information processing apparatus executes write in data of the communication apparatus, whether a normal value is written in a predetermined area in the data; and a control unit configured to control, based on a result of the determination by the determination unit, whether to shift a state of the communication apparatus from a power saving state to a normal state in which power consumption is larger than in the power saving state, wherein if it is determined that the normal value is written in the predetermined area, the control unit shifts the state of the communication apparatus from the power saving state to the normal state, and if it is not determined that the normal value is written in the predetermined area, the control unit does not shift the state of the communication apparatus from the power saving state to the normal state.

According to the present invention, it is possible to appropriately control the power state of an apparatus.

Further features of the present invention will become apparent from the following description of exemplary embodiments with reference to the attached drawings.

BRIEF DESCRIPTION OF THE DRAWINGS

FIG. 4 is a table showing GATT data;

FIGS. 5A and 5B are flowcharts illustrating GATT data registration processing;

FIG. 6 is a flowchart illustrating the GATT data registration processing;

FIG. 7 is a sequence chart showing connection processing between the communication apparatus and the information processing apparatus;

FIGS. 12A and 12B are flowcharts illustrating return control processing from a power saving state of a communication apparatus;

FIG. 13 is a table showing a data format; and

FIGS. 14A to 14C are flowcharts illustrating return control processing from a power saving state of a communication apparatus.

DESCRIPTION OF THE EMBODIMENTS

Figure 1:
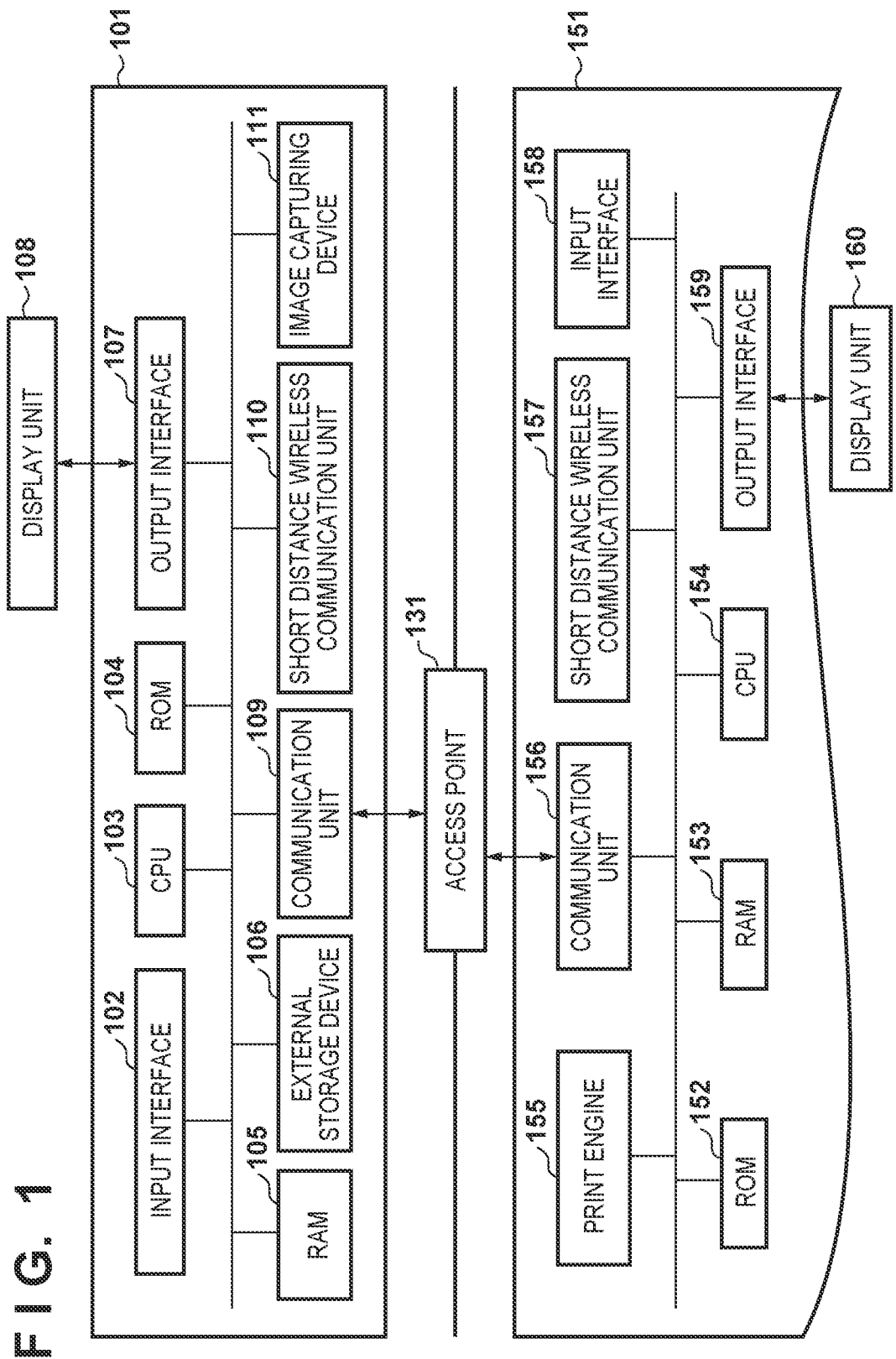
FIG. 1 is a block diagram showing the arrangements of an information processing apparatus and a communication apparatus.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

In a case that a command is sent from an information processing apparatus to a communication apparatus by performing short distance wireless communication by BLE to execute predetermined processing, the communication apparatus is returned from a power saving state to a normal active state.

However, even if a command, such as a setting change instruction, that can execute processing even in the power saving state in which power consumption is suppressed, if the communication apparatus is returned from the power saving state to the normal active state, the power consumption unwantedly increases.

According to the present invention, it is possible to appropriately control the power state of the apparatus.

First Embodiment

An information processing apparatus and a communication apparatus included in a communication system according to this embodiment will be described. This embodiment exemplifies a smartphone as the information processing apparatus but the present invention is not limited to this, and various apparatuses such as a portable terminal, a notebook PC, a tablet terminal, a PDA (Personal Digital Assistant), and a digital camera are applicable. Furthermore, this embodiment exemplifies a printer as the communication apparatus but the present invention is not limited to this, and various apparatuses are applicable as long as they can wirelessly communicate with the information processing apparatus. For example, as a printer, an inkjet printer, a full color laser beam printer, a monochrome printer, or the like is applicable. Instead of the printer, a copying machine, a facsimile apparatus, a portable terminal, a smartphone, a notebook PC, a tablet terminal, a PDA, a digital camera, a music reproduction device, a television, a smart speaker, or the like is applicable. Alternatively, a multifunction peripheral having a plurality of functions such as a copy function, a FAX function, and a print function is applicable.

The arrangement of information processing apparatus of this embodiment and that of the communication apparatus communicable with the information processing apparatus of this embodiment will be described with reference to a block diagram shown in FIG. 1. In this embodiment, the following arrangements will be exemplified but an arrangement corresponding to a function executable by each apparatus can be included appropriately.

An information processing apparatus 101 includes an input interface 102, a CPU 103, a ROM 104, a RAM 105, an external storage device 106, an output interface 107, a display unit 108, a communication unit 109, a short distance wireless communication unit 110, and an image capturing device 111. The input interface 102 is an interface configured to accept a data input and an operation instruction from the user, and is formed by a physical keyboard, buttons, a touch panel, and the like. Note that the output interface 107 and the input interface 102 (to be described later) may have the same arrangement, and output of a screen and acceptance of an operation from the user may be done by the same arrangement.

The CPU 103 is a system control unit, and comprehensively controls the overall information processing apparatus 101. The ROM 104 stores permanent data such as control programs to be executed by the CPU 103, data tables, and an embedded operating system (to be referred to as OS hereinafter) program. In this embodiment, the respective control programs stored in the ROM 104 perform software execution control such as scheduling, task switch, and interrupt processing under the management of the embedded OS stored in the ROM 104.

The RAM 105 is formed by an SRAM (Static Random Access Memory) or the like that needs a backup power supply. Note that the RAM 105 can store important data such as program control variables without volatilization because the data are held by a primary battery (not shown) for data backup. In addition, a memory area that stores setting information of the information processing apparatus 101, management data of the information processing apparatus 101, and the like is also provided in the RAM 105. Furthermore, the RAM 105 is used as the main memory and the work memory of the CPU 103.

The external storage device 106 stores an application (to be referred to as a print application hereinafter) that provides a print execution function. The external storage device 106 also stores various programs such as a print information generation program for generating print information interpretable by a communication apparatus 151, and an information transmission/reception control program for performing transmission/reception to/from the communication apparatus 151 connected via the communication unit 109. In addition, the external storage device 106 stores various kinds of information to be used by the programs. The external storage device 106 also stores image data externally obtained from the Internet or another information processing apparatus via the communication unit 109.

The output interface 107 is a control interface configured to cause the display unit 108 to display data or make a notification of the state of the information processing apparatus 101. The display unit 108 is formed by an LED (Light-Emitting Diode), an LCD (Liquid Crystal Display), or the like, and displays data or makes a notification of the state of the information processing apparatus 101. Note that a software keyboard including keys such as numerical value input keys, a mode setting key, an enter key, a cancel key, and a power key may be installed on the display unit 108 to accept an input from the user via the display unit 108.

The communication unit 109 is configured to be connected to an apparatus such as the communication apparatus 151 to execute data communication. For example, the communication unit 109 can be connected to an access point (not shown) in the communication apparatus 151. In a case that the communication unit 109 and the access point in the communication apparatus 151 are connected to each other, the information processing apparatus 101 and the communication apparatus 151 can communicate with each other. Note that the communication unit 109 may directly communicate with the communication apparatus 151 by wireless communication, or may communicate with the communication apparatus 151 via an external access point (access point 131) existing outside the information processing apparatus 101 and the communication apparatus 151. As the wireless communication method, for example, Wi-Fi (Wireless Fidelity)®, Bluetooth®, or the like can be used. As the access point 131, for example, a device such as a wireless LAN router can be used. Note that in this embodiment, a method of connecting the information processing apparatus 101 and the communication apparatus 151 directly without intervention of the external access point will be referred to as a direct connection method hereinafter. In addition, a method of connecting the information processing apparatus 101 and the communication apparatus 151 via the external access point will be referred to as an infrastructure connection method hereinafter.

The short distance wireless communication unit 110 is configured to wirelessly be connected to an apparatus such as the communication apparatus 151 in a short distance to execute data communication, and performs communication using a communication method different from that of the communication unit 109. The short distance wireless communication unit 110 can be connected to a short distance wireless communication unit 157 in the communication apparatus 151. Note that in this embodiment, as the communication method of the short distance wireless communication unit 110, Bluetooth Low Energy (BLE) is used. The image capturing device 111 is a device that converts an image captured by an image sensor into digital data. The digital data is temporarily stored in the RAM 105. After that, the digital data is converted into a predetermined image format by the program executed by the CPU 103, and stored as image data in the external storage device 106.

The communication apparatus 151 includes a ROM 152, a RAM 153, a CPU 154, a print engine 155, a communication unit 156, the short distance wireless communication unit 157, an input interface 158, an output interface 159, and a display unit 160.

The ROM 152 stores permanent data such as control programs to be executed by the CPU 154, data tables, and an OS program. The communication unit 156 includes, as an access point in the communication apparatus 151, an access point for performing connection to an apparatus such as the information processing apparatus 101. Note that the access point can be connected to the communication unit 109 of the information processing apparatus 101. Note also that the communication unit 156 may directly communicate with the information processing apparatus 101 by wireless communication, or may communicate with the information processing apparatus 101 via the access point 131. As the wireless communication method, for example, Wi-Fi®, Bluetooth®, or the like can be used. The communication unit 156 may include a hardware component functioning as an access point or may operate as an access point by software for functioning as an access point.

The RAM 153 is formed by a DRAM or the like that needs a backup power supply. Note that the RAM 153 can store important data such as program control variables without volatilization because the data are held by supplying power (not shown) for data backup. Furthermore, the RAM 153 is used as the main memory and the work memory of the CPU 154, and functions as a reception buffer for temporarily saving print information received from the information processing apparatus 101 or the like. The ROM 152 stores permanent data such as control programs to be executed by the CPU 154, data tables, and an OS program. In this embodiment, the respective control programs stored in the ROM 152 perform software execution control such as scheduling, task switch, and interrupt processing under the management of the embedded OS stored in the ROM 152. In addition, a memory area that stores data necessary to be held even when no power is supplied, such as setting information of the communication apparatus 151 and management data of the communication apparatus 151, is also provided in the ROM 152.

The CPU 154 is a system control unit, and comprehensively controls the overall communication apparatus 151. Based on the information stored in the RAM 153 or a print job received from the information processing apparatus 101 or the like, the print engine 155 forms an image on a print medium such as a paper sheet using a printing material such as ink and outputs the print result. At this time, the print job transmitted from the information processing apparatus 101 or the like has a large transmission data amount, and high-speed communication is required. Thus, the print engine 155 receives the print job via the communication unit 156 capable of performing communication at a higher speed than the short distance wireless communication unit 157.

The input interface 158 is an interface configured to accept a data input and an operation instruction from the user, and is formed by a physical keyboard, buttons, a touch panel, and the like. Note that the output interface 159 and the input interface 158 (to be described later) may have the same arrangement, and output of a screen and acceptance of an operation from the user may be done by the same arrangement. The output interface 159 is a control interface configured to cause the display unit 160 to display data or make a notification of the state of the communication apparatus 151.

The display unit 160 is formed by an LED (Light Emitting Diode), an LCD (Liquid Crystal Display), or the like, and displays data or makes a notification of the state of the communication apparatus 151. Note that a software keyboard including keys such as numerical value input keys, a mode setting key, an enter key, a cancel key, and a power key may be installed on the display unit 160 to accept an input from the user via the display unit 160.

Figure 2:
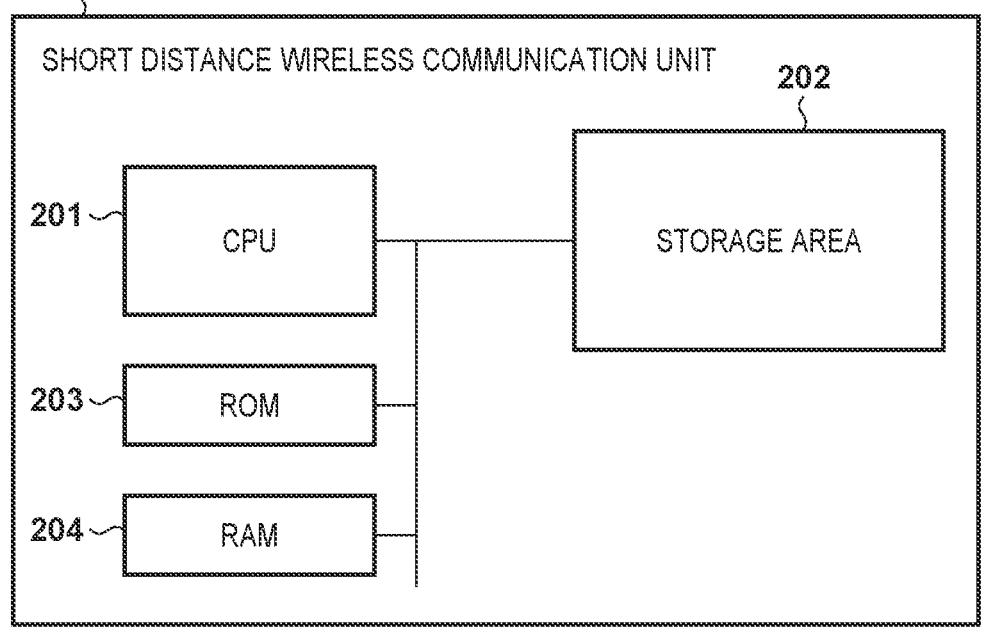
FIG. 2 is a block diagram showing the arrangement of a short distance wireless communication unit.

FIG. 2 is a block diagram showing an example of the arrangement of the short distance wireless communication unit 157. The short distance wireless communication unit 157 is configured to wirelessly be connected to an apparatus such as the information processing apparatus 101 in a short distance. In this embodiment, as the communication method of the short distance wireless communication unit 157, Bluetooth Low Energy (BLE) is used. The short distance wireless communication unit 157 and the CPU 154 communicate with each other via a bus interface such as I2C (Inter-Integrated Circuit). Furthermore, in the short distance wireless communication unit 157, a CPU 201, a storage area 202, a ROM 203, and a RAM 204 are provided. The storage area 202 can be accessed from the CPU 154, and accessed from the information processing apparatus 101 via the short distance wireless communication unit 110. The RAM 204 is formed by a DRAM or the like that needs a backup power supply. Note that the RAM 204 can store important data such as program control variables without volatilization because the data are held by supplying power (not shown) for data backup. Furthermore, the RAM 204 is used as the main memory and the work memory of the CPU 201. The ROM 203 stores permanent data such as control programs to be executed by the CPU 201, data tables, and an OS program. Note that a memory such as an external HDD or SD card may be attached as an optional device to the communication apparatus 151, and information saved in the communication apparatus 151 may be stored in the memory.

The arrangements of the information processing apparatus 101 and the communication apparatus 151 have been described above as an example, but other arrangements may be adopted. For example, the short distance wireless communication unit 110 may have the arrangement shown in FIG. 2.

The outline of GATT (Generic Attribute Profile) communication in the BLE standard will now be described. GATT is a profile that controls read and write (transmission/reception) of information in the BLE standard. In GATT communication, two roles of a GATT client and a GATT server are defined based on the transfer source and transfer destination of data. The GATT client transmits a request to the GATT server and receives a response from the GATT server. In this embodiment, the information processing apparatus 101 serves as the GATT client. The GATT client can read information held in a storage area in the short distance wireless communication unit of the GATT server and write information in the storage area. Upon receiving a request from the GATT client, the GATT server returns a response to the GATT client. In this embodiment, the communication apparatus 151 serves as the GATT server, and the information processing apparatus 101 serves as the GATT client. Note that the GATT server operates as a device that stores state information of the GATT server and the like.

Figure 3:
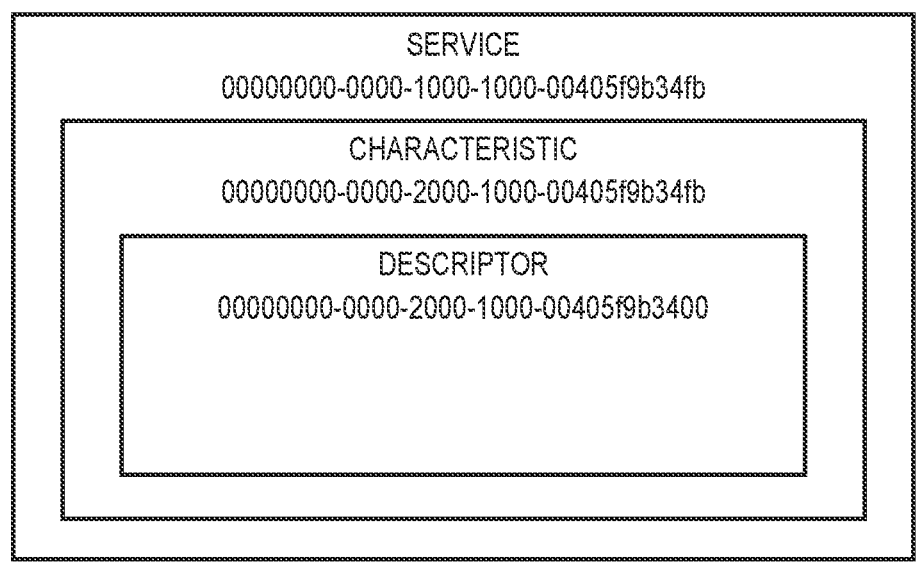
FIG. 3 is a view showing the data format of GATT data.

The data format of GATT will be described next. GATT data has a hierarchical structure as shown in FIG. 3, which includes three elements called a service, a characteristic, and a descriptor. Note that the descriptor may be absent. In this embodiment, the descriptor does not exist in GATT data constructed by the short distance wireless communication unit 157. Each of the service, the characteristic, and the descriptor can be identified by a UUID (Universally Unique Identifier) of 32 digits. The UUID is used as an identifier for uniquely identifying an object on software. The UUID is a 128-bit numerical value and is normally expressed in hexadecimal like, for example, "550e8400-e29b-41d4-a716-446655440000". Note that some services, characteristics, and descriptors are defined by the standard of Bluetooth SIG or are unique to a vendor. The UUID unique to a vendor is expressed by 32 digits, as described above, but the UUID defined by the standard of Bluetooth SIG is expressed by four digits. For example, the UUID defined by the standard of Bluetooth SIG is expressed like "2A49".

A service puts attributes in GATT data into groups based on a common part, and each service includes one or more characteristics. As for a characteristic, a single value is set for each characteristic. As for a descriptor, an attribute value used in a case that additional information is necessary for a characteristic is set. A read/write attribute as a set value representing whether to permit the GATT client to do read or write can be set for each of the service, the characteristic, and the descriptor.

The GATT client can designate the UUID of each of the service and the characteristic, thereby executing read/write for a value set for the designated characteristic. Whether read/write can be executed is based on the read/write attribute set for each of the service and the characteristic.

FIG. 4 is a table showing an example of GATT data constructed by the short distance wireless communication unit 157. In the GATT data shown in FIG. 4, a "service UUID" item 401 represents a UUID assigned to each service. A "service name" item 402 represents the name of each service. A "characteristic UUID" item 403 represents a UUID assigned to each characteristic. A "characteristic name" item 404 represents the name of each characteristic. A "service read enable" item 405 represents whether the information processing apparatus 101 can read a value concerning each service. A "service write enable" item 406 represents whether the information processing apparatus 101 can write a value concerning each service. A "characteristic read enable" item 407 represents whether the information processing apparatus 101 can read a value concerning each characteristic. A "characteristic write enable" item 408 represents whether the information processing apparatus 101 can write a value concerning each characteristic. In FIG. 4, "○" represents that write or read can be done, and a blank represents that write or read cannot be done. A "characteristic indicatable" item 409 represents whether, if the communication apparatus 151 updates a value concerning each characteristic, it is possible to make an indication (notification) to the information processing apparatus 101. In FIG. 4, "○" represents that it is possible to make an indication, and a blank represents that it is impossible to make an indication.

A "pairing need" item 411 represents whether to permit the information processing apparatus 101 to write or read the value concerning each characteristic in a case that pairing has not been done. If the "service read enable" item 405 indicates that read can be done and the "characteristic read enable" item 407 indicates that read can be done, the information processing apparatus 101 can read the value concerning the corresponding characteristic. If the "service read enable" item indicates that read can be done and the "characteristic read enable" item indicates that read cannot be done, the information processing apparatus 101 cannot read the value concerning the corresponding characteristic.

A "value" item 410 represents a value set for each characteristic. If the "pairing need" item 411 indicates that pairing is unnecessary (blank), the information processing apparatus 101 can read/write the value concerning the corresponding characteristic even in a state in which the information processing apparatus 101 is not paired with the communication apparatus 151. On the other hand, if the "pairing need" item indicates that pairing is necessary ("○" is displayed), the information processing apparatus 101 cannot read/write the value concerning the corresponding characteristic unless the information processing apparatus 101 is paired with the communication apparatus 151.

An example of pairing processing will be described below. First, in a case that a print application is activated and an execution instruction of the pairing processing is accepted from the user via the print application, the information processing apparatus 101 starts searching for advertisement information including specific apparatus information. Note that the specific apparatus information is, for example, the UUID or MAC address of an apparatus (printer or the like) corresponding to the print application. Upon receiving advertisement information including specific apparatus information, the information processing apparatus 101 displays, on the display unit 108, a list of apparatuses as the transmission sources of pieces of advertisement information each including specific apparatus information, and accepts, from the user, selection of an apparatus to be paired. In this example, assume that the communication apparatus 151 is selected.

If the selection of the apparatus to be paired is accepted, the information processing apparatus 101 transmits a pairing request to the communication apparatus 151 by communication using a security manager protocol. Note that the communication between the apparatuses is performed by the security manager protocol until the pairing processing ends. Upon receiving the pairing request, the communication apparatus 151 displays a PIN code display screen on the display unit 160. A PIN code and a cancel button used to cancel the pairing processing are displayed on the PIN code display screen. In a case that transmitting the pairing request, the information processing apparatus 101 displays a PIN code input screen on the display unit 108. A PIN code input region used to accept input of a PIN code by the user, an OK button used to transmit the input PIN code to the communication apparatus 151, and a cancel button used to cancel the pairing processing are displayed on the PIN code input screen. If the OK button is pressed in a state in which the PIN code is input to the PIN code input region, the information processing apparatus 101 transmits information including the input PIN code to the communication apparatus 151. The communication apparatus 151 determines whether the PIN code included in the received information matches the PIN code displayed on the PIN code display screen. If it is determined that the PIN codes match, the communication apparatus 151 permits the information processing apparatus 101 to be paired. For example, the communication apparatus 151 exchanges link keys (authentication information) created based on the PIN code by a predetermined method with the information processing apparatus 101 using the SMP (Security Manager Protocol) of the BLE standard. The exchanged link keys are saved in the storage area (for example, the ROM 104) in the information processing apparatus 101 and the storage area (for example, the ROM 152) in the communication apparatus 151. The pairing processing is thus completed, and BLE communication between the apparatuses is permitted from then on.

In a case that transmitting a GATT communication request to the communication apparatus 151 after the completion of the pairing processing, the information processing apparatus 101 notifies the communication apparatus 151 of the link key saved in the storage area at the time of the pairing processing. Upon receiving the GATT communication request, the communication apparatus 151 compares the link key saved in the storage area at the time of the pairing processing with the notified link key, and confirms whether the apparatus of the transmission source of the GATT communication request is a paired apparatus. If it can be confirmed that the apparatus is a paired apparatus, the communication apparatus 151 starts read/write of information by GATT communication with the information processing apparatus 101. Thus, once the pairing processing with the communication apparatus 151 is completed, the information processing apparatus 101 can execute GATT communication with the communication apparatus 151 without input of the PIN code by the user.

Note that the pairing processing is not limited to the above-described PIN code input type, and another pairing method may be used. An example in which the pairing processing is executed by the pairing method based on the BLE standard has been described above. However, the present invention is not limited to this form. As long as the pairing processing is processing in which the communication apparatus 151 authenticates the information processing apparatus 101 by BLE, for example, a proprietary pairing method of the vendor of the communication apparatus 151 may be used instead of the pairing method based on the BLE standard.

Figure 5B:
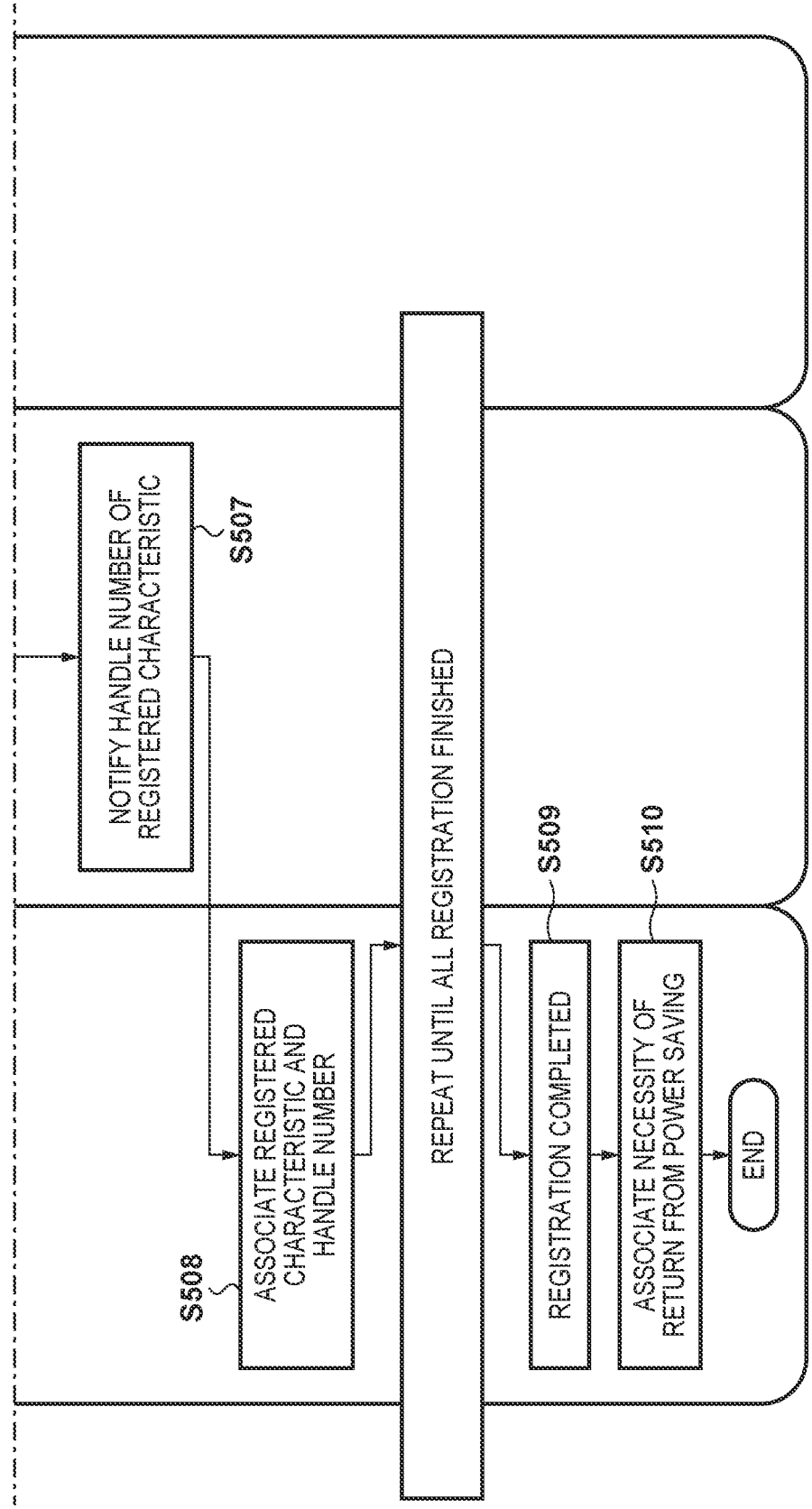

FIGS. 5A and 5B are flowcharts illustrating processing of registering GATT data in the short distance wireless communication unit 157, which is executed by the communication apparatus 151. The processing of the communication apparatus 151 indicated by the processing sequence of FIGS. 5A and 5B is implemented in a case that, for example, the CPU 154 loads the control program stored in the ROM 152 or the HDD (not shown) of the communication apparatus 151 into the RAM 153 and executes it. In this embodiment, if the communication apparatus 151 is powered off, the short distance wireless communication unit 157 is also powered off, and the structure of the GATT data is reset. Therefore, every time the communication apparatus 151 is powered on, the GATT data registration processing shown in FIGS. 5A and 5B is executed.

In step S501, the CPU 154 of the communication apparatus 151 instructs the short distance wireless communication unit 157 to register the first service configured as GATT data. In step S502, the CPU 201 of the short distance wireless communication unit 157 registers the first service for which the registration instruction has been received in step S501. Note that registration of the service indicates, for example, construction of data corresponding to the service of the GATT data as shown in FIG. 4. In step S503, the CPU 201 of the short distance wireless communication unit 157 assigns a handle number to the service registered in step S502, and notifies the CPU 154 of the handle number.

In step S504, the CPU 154 associates, with the handle number notified in step S503, the service for which the registration instruction has been made in step S501. The service may be associated with the handle number by, for example, assigning a unique ID to each service, and registering the ID and the handle number in a table format. Alternatively, the service may be associated with the handle number by registering the UUID of the service and the handle number in a table format, or another method may be used as long as the service can be associated with the structure of the GATT data in the short distance wireless communication unit 157.

In step S505, the CPU 154 instructs the short distance wireless communication unit 157 to register the first characteristic in the service for which the registration instruction has been made in step S501. In step S506, the CPU 201 of the short distance wireless communication unit 157 registers the first characteristic for which the registration instruction has been received in step S505. Note that registration of the characteristic indicates, for example, construction of data corresponding to the characteristic of the GATT data as shown in FIG. 4. In step S507, the CPU 201 of the short distance wireless communication unit 157 assigns a handle number to the characteristic registered in step S506, and notifies the CPU 154 of the handle number.

In step S508, the CPU 154 associates, with the handle number notified in step S507, the characteristic for which the registration instruction has been made in step S505. The characteristic may be associated with the handle number by, for example, assigning a unique ID to each characteristic, and registering the ID and the handle number in a table format. Alternatively, the characteristic may be associated with the handle number by registering the UUID of the characteristic and the handle number in a table format, or another method may be used as long as the characteristic can be associated with the structure of the GATT data in the short distance wireless communication unit 157.

The CPUs 154 and 201 repeat the processes in steps S501 to S508 until registration of all the services and all the characteristics is completed. In this embodiment, the descriptor does not exist in the GATT data constructed by the short distance wireless communication unit 157. However, processing of registering the descriptor and associating, with a handle number, the descriptor for which a registration instruction is made may be executed.

In step S509, the CPU 154 completes registration of the structure of the GATT data. For example, the registered GATT data is constructed, as shown in FIG. 4.

Figure 9:
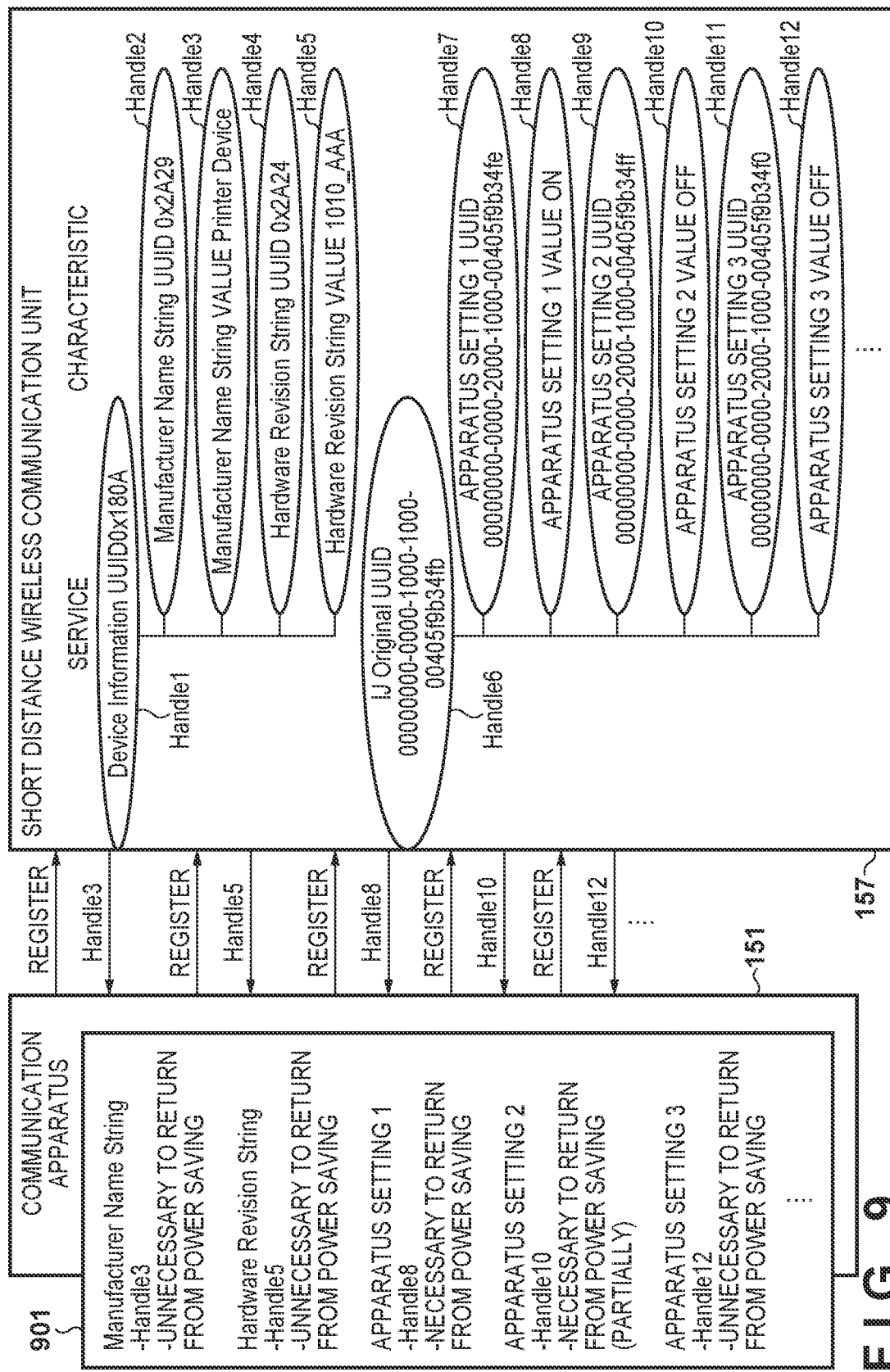
FIG. 9 is a view showing a table obtained by performing association.

FIG. 9 shows an example of a table 901 obtained by performing association in the processing shown in FIGS. 5A and 5B. For example, if a characteristic registration instruction is made in step S505, a value of a characteristic "Manufacturer Name String" is registered in step S506. In step S507, a notification of a handle number "3" of the characteristic "Manufacturer Name String" is made. Then, the notified handle number "3" is associated with the characteristic "Manufacturer Name String" in the table 901. Similarly, a notified handle number "5" is associated with a characteristic "Hardware Revision String" in the table 901. If all the characteristics are associated with handle numbers for a service "Device Information", the same processes are performed for another service "IJ original". That is, a notified handle number "8" is associated with a characteristic "apparatus setting 1" in the table 901, and a notified handle number "10" is associated with a characteristic "apparatus setting 2" in the table 901. Furthermore, a notified handle number "12" is associated with a characteristic "apparatus setting 3" in the table 901. In the table 901, the characteristic and the handle number are associated with each other but the service and the handle number may be associated with each other. Both the service and the characteristic may be associated with the handle number.

In step S510, the CPU 154 further associates, with the correspondence between the structure of the GATT data and the handle number, information indicating whether it is necessary to return from the power saving state to the normal active state. In this embodiment, the normal active state indicates a state in which power is supplied to the memory such as the ROM 152 and the print engine 155. The power saving state indicates a state in which the main program is active but control is performed to suppress the power consumption. In this state, for example, power is supplied to the memory such as the ROM 152 but no power is supplied to the print engine 155. Therefore, to execute printing, it is necessary to return from the power saving state to the normal active state. On the other hand, if, for example, print settings stored in the memory are changed, it is unnecessary to return from the power saving state to the normal active state. Note that the power saving state and the normal active state are not limited to the above-described forms. For example, as the relationship between the power saving state and the normal active state, the power saving state need only be a state in which power is saved more than in the normal active state. The power saving state need only be a state in which no power is supplied to at least some of components which are supplied with power in the normal active state.

As information indicating whether it is necessary to return from the power saving state, two values of "necessary" and "unnecessary" may be used. For example, in the table 901 shown in FIG. 9, the characteristic "apparatus setting 1" is associated with "necessary to return from power saving". This indicates that the communication apparatus 151 returns from the power saving state to the normal active state in a case that the information processing apparatus 101 executes write in the characteristic "apparatus setting 1". The characteristic "apparatus setting 1" is, for example, a characteristic for instructing execution of printing. Furthermore, in the table 901 shown in FIG. 9, the characteristic "apparatus setting 3" is associated with "unnecessary to return from power saving". This indicates that the communication apparatus 151 is maintained in the power saving state even if the information processing apparatus 101 executes write in the characteristic "apparatus setting 3". The characteristic "apparatus setting 3" is, for example, a characteristic for instructing change of printer settings.

There may be information of "partially return" indicating that it is necessary to return from the power saving state with respect to part of the apparatus. "Partially return" indicates, for example, that power is supplied to only a LAN module in addition to blocks which are supplied with power in the power saving state. In the table 901 shown in FIG. 9, the characteristic "apparatus setting 2" is associated with "necessary to return from power saving (partially)". This indicates that power is supplied to part of the communication apparatus 151, for example, the LAN module in a case that the information processing apparatus 101 executes write in the characteristic "apparatus setting 2".

In FIGS. 5A and 5B, the information indicating whether it is necessary to return from the power saving state is associated upon completion of registration of the structure of the GATT data. However, before step S501, the characteristic may be associated, in advance, with the information indicating whether it is necessary to return from the power saving state. Every time association with the structure of the GATT data in the short distance wireless communication unit 157 is performed in step S504 or S508, the information indicating whether it is necessary to return from the power saving state may be associated.

FIG. 6 is a flowchart illustrating the processing of the communication apparatus 151 shown in FIGS. 5A and 5B. Processing in step S601 is the same as that in step S501 and a description thereof will be omitted. In step S602, the CPU 154 of the communication apparatus 151 determines whether the handle number notified from the CPU 201 of the short distance wireless communication unit 157 matches the handle number of the service instructed in step S601. The processing in step S602 is repeated until it is determined that the notified handle number matches the handle number of the service instructed in step S601. If it is determined that the notified handle number matches the handle number of the service instructed in step S601, the process advances to step S603 and the processing in step S504 is performed.

Processing in step S604 is the same as that in step S505 and a description thereof will be omitted. In step S605, the CPU 154 determines whether the handle number notified from the CPU 201 of the short distance wireless communication unit 157 matches the handle number of the characteristic instructed in step S604. The processing in step S605 is repeated until it is determined that the notified handle number matches the handle number of the characteristic instructed in step S604. If it is determined that the notified handle number matches the handle number of the characteristic instructed in step S604, the process advances to step S606 and the processing in step S508 is performed.

In step S607, the CPU 154 determines whether the processing in step S606 has been executed for the last characteristic in the service for which the registration instruction has been made. If it is determined that the processing in step S606 has not been executed for the last characteristic, the processes are repeated from step S604. On the other hand, if it is determined that the processing in step S606 has been executed for the last characteristic, the process advances to step S608.

In step S608, the CPU 154 determines whether the processing in step S603 has been executed for the last service in the GATT data. If it is determined that the processing in step S603 has not been executed for the last service, the processes are repeated from step S601. On the other hand, if it is determined that the processing in step S603 has been executed for the last service, the process advances to step S609. After that, the processing in step S509 is executed in step S609, and the processing in step S510 is executed in step S610.

As described above, in this embodiment, each characteristic region of a vendor region is associated with information indicating whether the information processing apparatus 101 is returned from the power saving state in a case that the information processing apparatus 101 executes write, and is managed. With this arrangement, even if the information processing apparatus 101 executes write in the characteristic, it is possible to control not to return from the power saving state, thereby suppressing the power consumption.

FIG. 7 is a sequence chart showing connection processing between the communication apparatus 151 and the information processing apparatus 101. The processing of the communication apparatus 151 shown in FIG. 7 is implemented in a case that, for example, the CPU 154 loads the control program stored in the ROM 152 or the HDD (not shown) of the communication apparatus 151 into the RAM 153 and executes it. Furthermore, the processing of the information processing apparatus 101 shown in FIG. 7 is implemented in a case that, for example, the CPU 103 loads the control program stored in the ROM 104 or an HDD (not shown) of the information processing apparatus 101 into the RAM 105 and executes it.

In the following description, assume that the communication apparatus 151 serves as an advertiser that transmits advertisement information at a predetermined interval. Assume also that the information processing apparatus 101 serves as a scanner that waits for advertisement information transmitted from an advertiser on the periphery. First, the short distance wireless communication unit 157 in the communication apparatus 151 transmits advertisement information (S701 to S703). The information processing apparatus 101 can recognize the existence of the communication apparatus 151 in a case that the short distance wireless communication unit 110 receives the advertisement information transmitted from the short distance wireless communication unit 157.

In a case that recognizing the communication apparatus 151 and performing connection to the communication apparatus 151, the information processing apparatus 101 transmits connection request information to the communication apparatus 151. For example, the short distance wireless communication unit 110 transmits CONNECT_REQ that is a request to transition to a connection event for establishing network connection by BLE (S704). In a case that the short distance wireless communication unit 157 receives CONNECT_REQ, the information processing apparatus 101 and the communication apparatus 151 start transitioning to the connection event. For example, the short distance wireless communication units 110 and 157 respectively notify the CPUs 103 and 154 that connection processing for GATT communication is complete. After that, the information processing apparatus 101 and the communication apparatus 151 transition from the scanner and the advertiser to a master and a slave, respectively, and the information processing apparatus 101 serving as the master and the communication apparatus 151 serving as the slave establish connection (BLE connection) for GATT communication. Note that in the BLE standard, a master can form a "one-to-multiple" star topology with slaves. After BLE connection is established, the information processing apparatus 101 and the communication apparatus 151 can perform data communication by the GATT communication method.

Before accessing the GATT data of the communication apparatus 151 by GATT communication, the information processing apparatus 101 needs to acquire the structure of the GATT data held by the communication apparatus 151. The structure of the GATT data includes, for example, the number of services in the GATT data, the number of characteristics, the values of UUIDs, and an attribute representing a read enable/disable state. An arrangement in which the information processing apparatus 101 acquires the structure of the GATT data is called "discovery".

After BLE connection is established in S704, the information processing apparatus 101 starts discovery in S705. For example, the information processing apparatus 101 transmits, to the communication apparatus 151, a discovery request to request information representing the structure of the GATT data of the communication apparatus 151. This causes the communication apparatus 151 to transmit, as a response to the discovery request, information representing the structure of the GATT data to the information processing apparatus 101. Upon receiving the information representing the structure of the GATT data, the information processing apparatus 101 specifies an area where a hash value is stored in the GATT data of the communication apparatus 151, and reads the hash value. Note that the hash value is a value stored in a database hash characteristic whose characteristic UUID in FIG. 4 is "0x2B2A". The communication apparatus 151 stores, as the value of the database hash characteristic, a hash value calculated in advance from the structure of the GATT data. That is, the hash value is a value uniquely determined in accordance with the structure of the GATT data of the communication apparatus 151.

Note that the information processing apparatus 101 stores, in the memory (for example, the ROM 104) of the information processing apparatus 101, a hash value read from a terminal to which the information processing apparatus 101 has been connected by BLE in the past. In S706, the information processing apparatus 101 compares the hash value read in S705 with the hash value (the hash value stored in the memory of the information processing apparatus 101) read in the past, and determines whether these hash values match (whether the read hash value has already been cached). That is, the information processing apparatus 101 determines whether the communication apparatus 151 is a terminal to which the information processing apparatus 101 has been connected by BLE in the past. In the determination processing, in addition to the hash value, the information processing apparatus 101 may add, as a determination criterion, other information such as individual identification information, for example, the MAC address of the communication apparatus 151.

If it is determined in S706 that the hash values do not match, the information processing apparatus 101 continues discovery to grasp the rest of the structure of the GATT data of the communication apparatus 151. To do this, in S707, the information processing apparatus 101 transmits, to the communication apparatus 151, a discovery request to request information representing the structure of the GATT data of the communication apparatus 151. Upon receiving the discovery request, the communication apparatus 151 transmits the information representing the structure of the GATT data to the information processing apparatus 101 in S708 (response). Note that transmission/reception of the discovery request and transmission/reception of the information representing the structure of the GATT data are repeated as many times as the number of services, characteristics, and descriptors in the GATT data. Therefore, in S709, transmission/reception of the discovery request and transmission/reception of the information representing the structure of the GATT data are repeated until transmission of all pieces of information representing the structure of the GATT data is completed.

After completion of transmission of all the pieces of information representing the structure of the GATT data, the information processing apparatus 101 stores, in S710, the structure of the GATT data of the communication apparatus 151 as a cache in the memory of the information processing apparatus 101. At this time, the information processing apparatus 101 stores the cache of the structure of the GATT data of the communication apparatus 151 and the hash value obtained from the communication apparatus 151 in the memory in association with each other. Note that the information processing apparatus 101 may further store other information such as individual identification information, for example, the MAC address of the communication apparatus 151 in the memory in association. Note that if it is determined in S706 that the hash values match, this indicates that the information processing apparatus 101 has already cached the structure of the GATT data of the communication apparatus 151, and thus the processes in S707 to S710 are skipped. By acquiring the structure of the GATT data of the communication apparatus 151, the information processing apparatus 101 can execute arbitrary GATT communication with the communication apparatus 151. In S711, the information processing apparatus 101 executes arbitrary GATT communication with the communication apparatus 151.

Note that GATT communication is communication which is performed using a GATT profile after BLE connection is established, and is communication performed via the short distance wireless communication units of the apparatuses. If BLE connection is established, the communication apparatus 151 may stop advertisement or switch contents of advertisement information to be transmitted. For example, the communication apparatus 151 may switch from advertisement information (ADV_IND) that allows the apparatus which has received the information to transmit a connection request to advertisement information (ADV_SCN_IND or ADV_NONCONN_IND) that does not allow the apparatus which has received the information to transmit a connection request.

After the GATT communication is completed, the information processing apparatus 101 transmits a release request in S712. Upon receiving the release request, the communication apparatus 151 transmits a release response in S713, and ends the BLE connection between the apparatuses. After the end of the BLE connection between the apparatuses, the information processing apparatus 101 and the communication apparatus 151 return to the scanner and the advertiser, respectively, and the communication apparatus 151 resumes transmission of advertisement information.

Figure 8:
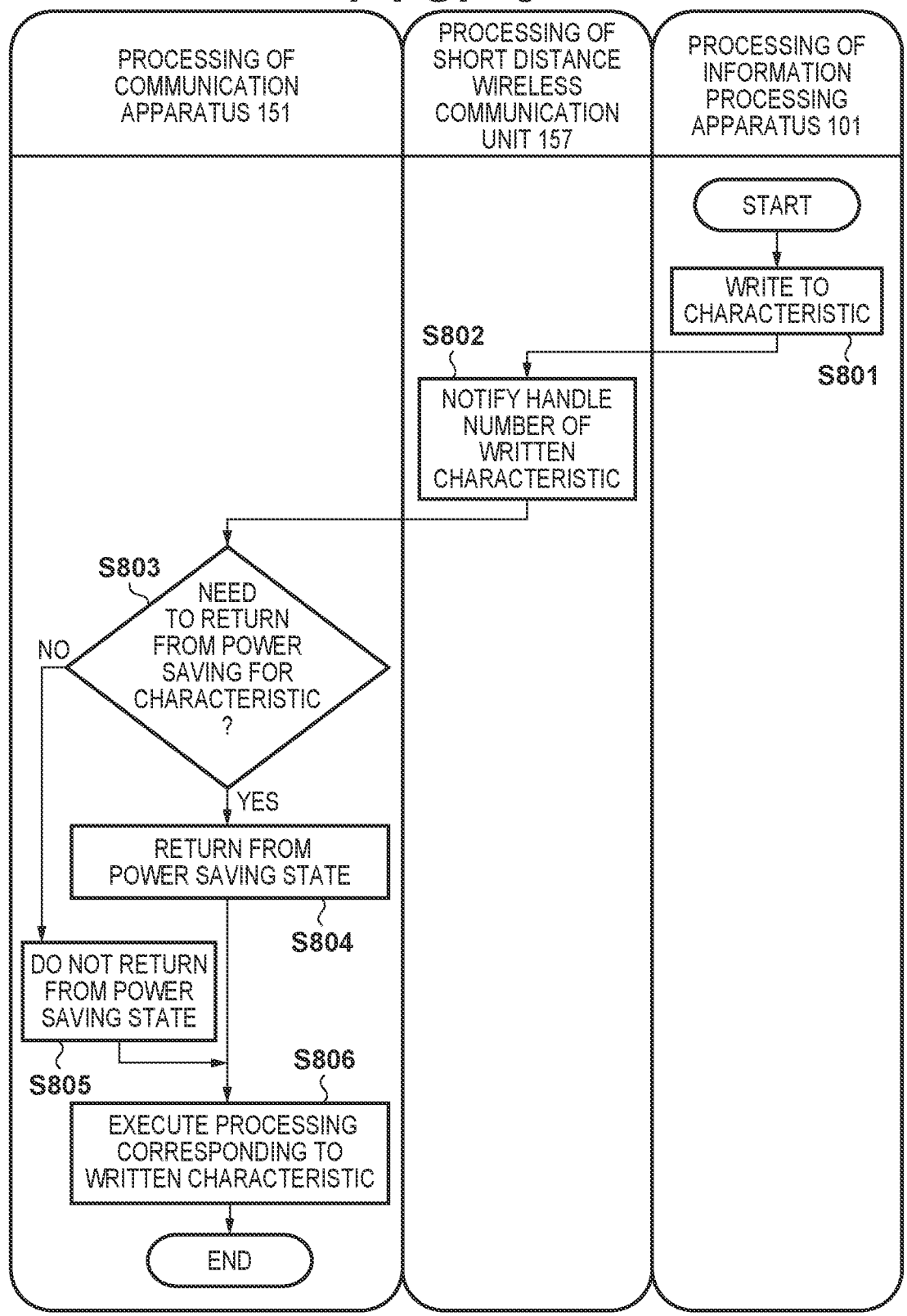
FIG. 8 is a flowchart illustrating return control processing from a power saving state of the communication apparatus.

FIG. 8 is a flowchart illustrating return control processing from the power saving state of the communication apparatus 151. The processing of the communication apparatus 151 indicated by the processing sequence of FIG. 8 is implemented in a case that, for example, the CPU 154 loads the control program stored in the ROM 152 or the HDD (not shown) of the communication apparatus 151 into the RAM 153 and executes it. Furthermore, the processing of the information processing apparatus 101 shown in FIG. 8 is implemented in a case that, for example, the CPU 103 loads the control program stored in the ROM 104 or the HDD (not shown) of the information processing apparatus 101 into the RAM 105 and executes it. The processing shown in FIG. 8 is performed in a state in which the information processing apparatus 101 and the communication apparatus 151 establish BLE connection and can perform data communication by the GATT communication method in S701 to S711. Furthermore, the processing shown in FIG. 8 starts in a case that the communication apparatus 151 is in the power saving state set in the table 901.

In step S801, by receiving a predetermined operation request from the user, the CPU 103 of the information processing apparatus 101 writes an operation request command in a predetermined characteristic of the short distance wireless communication unit 157 via the short distance wireless communication unit 110. The operation request command indicates write in the predetermined characteristic. A plurality of areas are provided as original characteristics of a vendor. For example, a characteristic for instructing execution of printing and a characteristic for instructing change of printer settings are provided. Each of these characteristics stores a value of "0" in a case that the GATT data is registered by the processing shown in FIGS. 5A and 5B. For example, the CPU 103 of the information processing apparatus 101 writes "1" in the characteristic for instructing execution of printing. In this embodiment, the write in the characteristic described above has been explained as write of the operation request command.

In step S802, the CPU 201 of the short distance wireless communication unit 157 transmits, to the CPU 154 of the communication apparatus 151, the handle number of the characteristic in which write has been done in step S801.

In step S803, with reference to the table 901 shown in FIG. 9, the CPU 154 determines whether it is necessary to return from the power saving state with respect to the characteristic associated with the handle number transmitted from the short distance wireless communication unit 157. Whether it is necessary to return from the power saving state may be determined based on the handle number of the characteristic or based on another condition. For example, the determination processing may be performed based on the handle number of the service or based on both the handle numbers of the service and the characteristic.

If it is determined in step S803 that it is necessary to return from the power saving state, the CPU 154 returns the communication apparatus 151 from the power saving state in step S804. On the other hand, if it is determined in step S803 that it is unnecessary to return from the power saving state, the CPU 154 maintains the communication apparatus 151 in the power saving state without returning the communication apparatus 151 from the power saving state in step S805.

Figure 10:
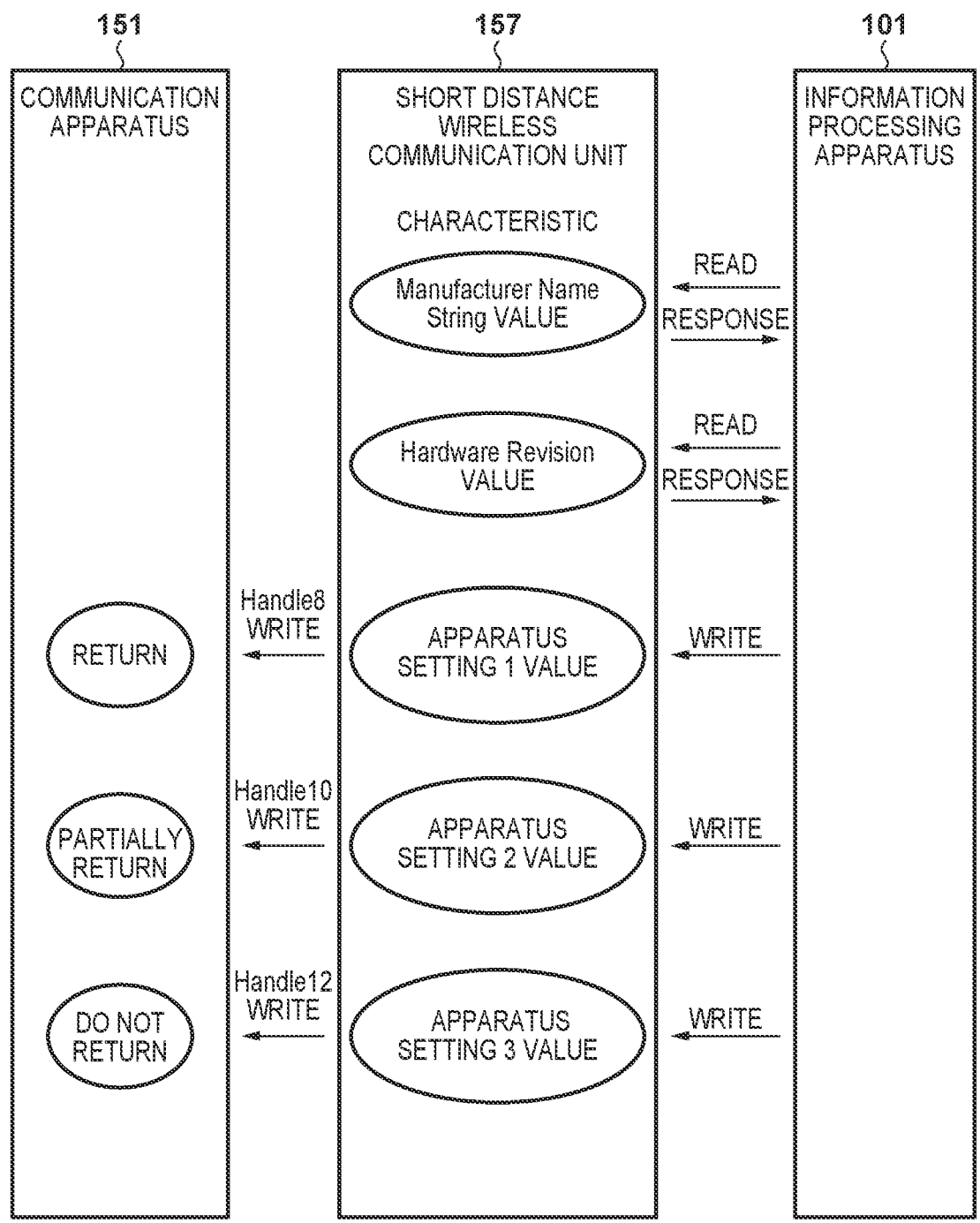
FIG. 10 is a view for explaining processing after step S803.

FIG. 10 is a view for explaining the processing after step S803 of FIG. 8. For example, if the information processing apparatus 101 executes write in the characteristic "apparatus setting 1" associated with the information representing that it is necessary to return from the power saving state, the communication apparatus 151 returns from the power saving state in step S804. For example, the characteristic "apparatus setting 1" is a characteristic for instructing execution of printing. If the information processing apparatus 101 executes write in the characteristic, the CPU 154 receives a notification of the handle number "8" from the CPU 201, and determines, with reference to the table 901, whether to return the communication apparatus 151 from the power saving state. Based on the table 901, the CPU 154 determines to return the communication apparatus 151 from the power saving state. In step S806, the CPU 154 executes processing corresponding to the characteristic in which the information processing apparatus 101 has written the operation request command in step S801, for example, print processing.

Furthermore, if the information processing apparatus 101 executes write in the characteristic "apparatus setting 3" associated with the information representing that it is unnecessary to return from the power saving state, the communication apparatus 151 does not return from the power saving state in step S805, and maintains the power saving state. For example, the characteristic "apparatus setting 3" is a characteristic for instructing change of printer settings. If the information processing apparatus 101 executes write in the characteristic, the CPU 154 receives a notification of the handle number "12" from the CPU 201, and determines, with reference to the table 901, whether to return the communication apparatus 151 from the power saving state. Based on the table 901, the CPU 154 determines not to return the communication apparatus 151 from the power saving state. Then, in step S806, the CPU 154 executes processing corresponding to the characteristic in which the information processing apparatus 101 has written the operation request command in step S801, for example, change of printer settings.

If the information processing apparatus 101 executes write in the characteristic "apparatus setting 2" associated with the information representing that it is necessary to partially return from the power saving state, the communication apparatus 151 partially returns from the power saving state in step S804. If the information processing apparatus 101 executes write in the characteristic, the CPU 154 receives a notification of the handle number "10" from the CPU 201, and determines, with reference to the table 901, to partially return the communication apparatus 151 from the power saving state. In step S806, the CPU 154 executes processing corresponding to the characteristic in which the information processing apparatus 101 has written the operation request command in step S801.

As described above, according to this embodiment, only when the operation request command is written in the area for which it is necessary to return from the power saving state, the communication apparatus 151 is returned from the power saving state, and it is thus possible to suppress the power consumption.

Figure 11:
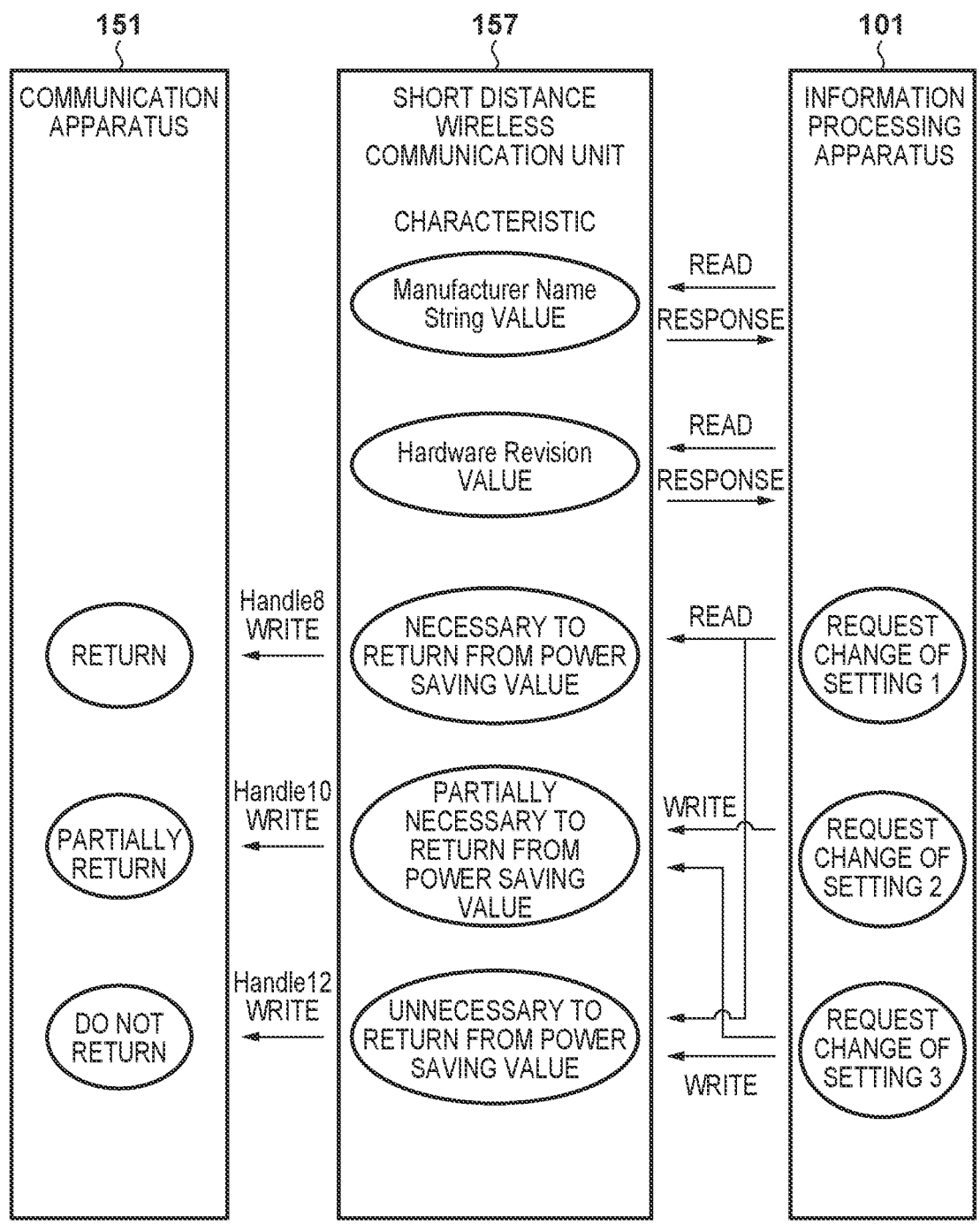
FIG. 11 is a view for explaining another processing after step S803.

In this embodiment, as shown in FIG. 10, the characteristic as the write destination of the operation request command and the corresponding processing are set in one-to-one correspondence. However, another arrangement may be adopted. For example, this embodiment has explained write of "1" as the operation request command. However, a value corresponding to each process such as execution of printing or change of printer settings may be written. In this case, as shown in FIG. 11, a characteristic corresponding to the necessity of returning from the power saving state and a characteristic corresponding to the unnecessity of returning from the power saving state are prepared. Then, the information processing apparatus 101 may switch the characteristic of the write destination every time. For example, if the information processing apparatus 101 writes a value corresponding to change of printer settings in the characteristic corresponding to the necessity of returning from the power saving state, the communication apparatus 151 returns from the power saving state. On the other hand, if the above value is written in the characteristic corresponding to the unnecessity of returning from the power saving state, the communication apparatus 151 maintains the power saving state without returning from the power saving state.

As described above, even if the same operation command is written, it is possible to switch whether it is necessary to return from the power saving state, in accordance with the state of the communication apparatus 151 or the information processing apparatus 101 or the transmission timing of the operation request command.

As described with reference to FIGS. 5A and 5B, the table 901 shown in FIG. 9 is created by the CPU 154 of the communication apparatus 151. Contents associated with the information representing whether it is necessary to return from the power saving state in step S510 may be changeable by a user operation or the like. For example, a user operation may be accepted via the display unit 160, or the set contents of the table 901 may be changeable in a case that the CPU 103 of the information processing apparatus 101 transmits, to the CPU 154, contents of a user operation accepted by the display unit 108.

Second Embodiment

Figure 12A:
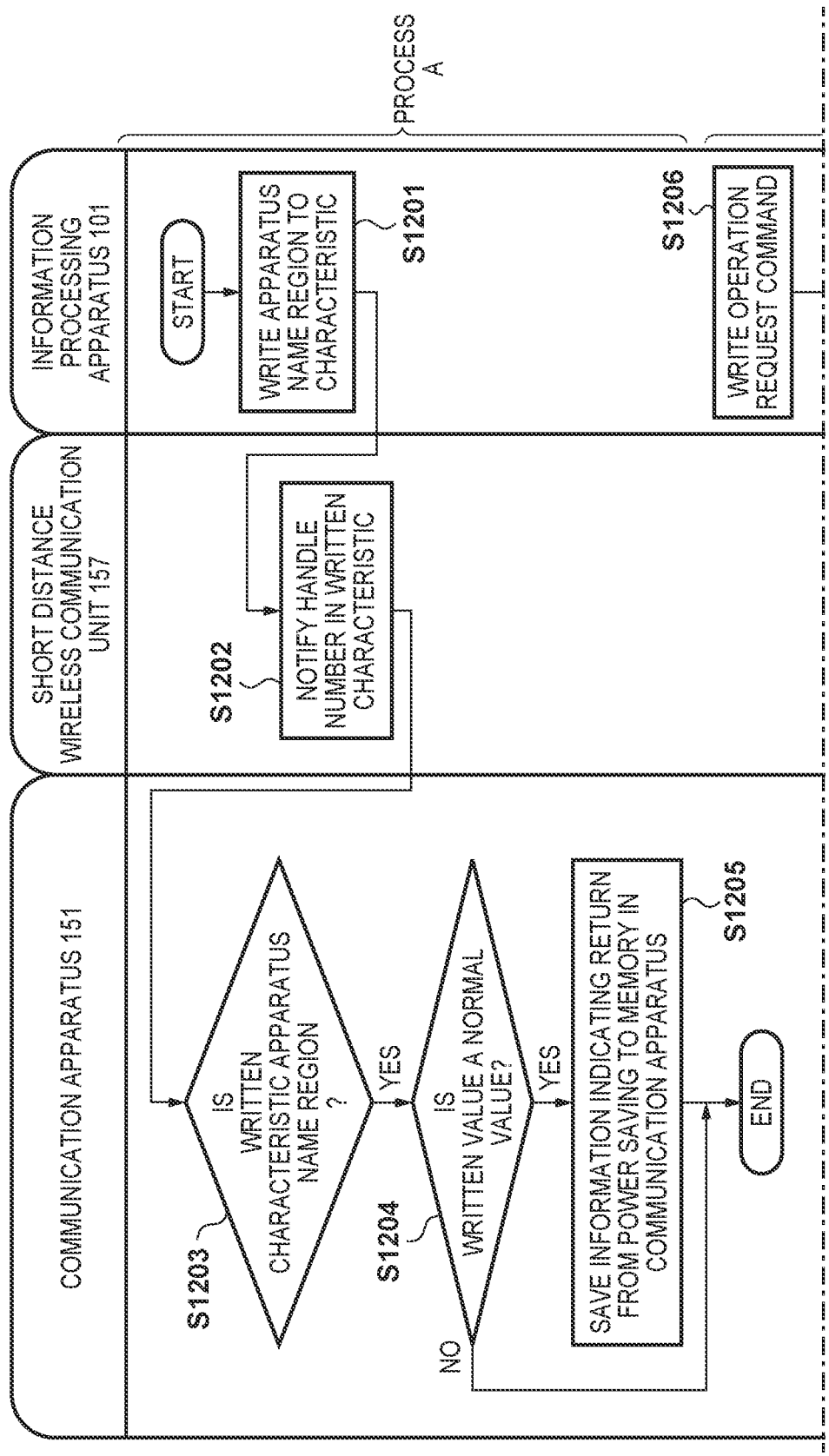

The second embodiment will be described below with respect to the difference from the first embodiment. FIGS. 12A and 12B are flowcharts illustrating return control processing from a power saving state of a communication apparatus 151 according to this embodiment. In this embodiment, a state in which an information processing apparatus 101 writes, in advance, a value in a characteristic "apparatus name" of a short distance wireless communication unit 157 is set as a condition for returning from the power saving state to a normal active state. The processing of the communication apparatus 151 shown in FIGS. 12A and 12B is implemented in a case that, for example, a CPU 154 loads a control program stored in a ROM 152 or an HDD (not shown) of the communication apparatus 151 into a RAM 153 and executes it. Furthermore, the processing of the information processing apparatus 101 shown in FIGS. 12A and 12B is implemented in a case that, for example, a CPU 103 loads a control program stored in a ROM 104 or an HDD (not shown) of the information processing apparatus 101 into a RAM 105 and executes it. In this embodiment, if processing A (YES is determined in step S1204) and processing B (NO is determined in step S1208) of FIGS. 12A and 12B are performed in this order, the communication apparatus 151 is returned from the power saving state. The processing shown in FIGS. 12A and 12B is performed in a state in which the information processing apparatus 101 and the communication apparatus 151 establish BLE connection and can perform data communication by the GATT communication method in S701 to S711.

In step S1201, the CPU 103 of the information processing apparatus 101 executes write in the characteristic "apparatus name" of GATT data constructed by the short distance wireless communication unit 157 with respect to the short distance wireless communication unit 157 via a short distance wireless communication unit 110. A value to be written may be a predetermined value such as "1", or a value capable of identifying the information processing apparatus 101. The characteristic "apparatus name" is an original characteristic area of a vendor.

In step S1202, a CPU 201 of the short distance wireless communication unit 157 transmits, to the CPU 154 of the communication apparatus 151, the handle number of the characteristic in which write has been done in step S1201. Transmission may be implemented by an interrupt to the CPU 154 or polling of the state of the short distance wireless communication unit 157 by the CPU 154.

In step S1203, with reference to a table 901 shown in FIG. 9, the CPU 154 determines whether the handle number transmitted in step S1202 matches the handle number of a predetermined characteristic. For example, the predetermined characteristic is the above-described characteristic "apparatus name". If it is determined that the handle number transmitted in step S1202 matches the handle number of the predetermined characteristic, the process advances to step S1204; otherwise, the process advances to step S1209. A case in which the process advances to step S1209 is a case in which an operation request command is written. This will be described later.

In step S1204, the CPU 154 acquires the value written in the predetermined characteristic in step S1201, and determines whether the acquired value is a normal value or an abnormal value.

Based on, for example, whether the acquired value is a value in a data format shown in FIG. 13, the CPU 154 determines whether the acquired value is a normal value or an abnormal value. To determine whether the acquired value is a normal value or an abnormal value, another condition may be used. For example, a value input in advance to the communication apparatus 151 via an input interface 158 is compared with the value written in the predetermined characteristic, and if the values match, it may be determined that the acquired value is a normal value. In this case, a plurality of values may be input in advance to the communication apparatus 151 via the input interface 158. Alternatively, based on the fact that the value is written in the predetermined characteristic, it may be determined that the acquired value is a normal value. Alternatively, a data list may be stored in advance in the ROM 152, a value included in the data list may be compared with the value written in the predetermined characteristic, and then if the values match, it may be determined that the acquired value is a normal value. In the data list, for example, a list of pieces of identification information of apparatuses which have been approved to access the GATT data constructed by the short distance wireless communication unit 157 is described. The identification information may include, for example, the apparatus name, MAC address, and model number of the information processing apparatus 101. If it is determined in step S1204 that the acquired value is a normal value, the process advances to step S1205; otherwise, processing A shown in FIGS. 12A and 12B ends.

In step S1205, the CPU 154 stores, in a storage area such as the RAM 153 in the communication apparatus 151, information representing that return from the power saving state is permitted in a case that an operation request command is subsequently written. This information may be, for example, a flag, and a flag indicating "1" is stored in the storage area. The CPU 154 monitors a time of "1" by a timer, and resets the flag to "0" in a case that a predetermined time elapses. The flag may be deleted in a case that the predetermined time elapses.

In this embodiment, if the information representing that return from the power saving state is permitted is stored, in a case that an operation request command is subsequently written, within the predetermined time, in a characteristic for which it is necessary to return from the power saving state, the communication apparatus 151 returns from the power saving state. On the other hand, if the information representing that return from the power saving state is permitted is not stored, even when the command is subsequently written in the characteristic within the predetermined time, the communication apparatus 151 does not return from the power saving state. As described above, since the condition is further added with respect to return from the power saving state, it is possible to prevent return from the power saving state in a case that an unexpected external apparatus executes write in the characteristic.

In the above description, if it is determined in step S1204 that the acquired value is an abnormal value, processing A shown in FIGS. 12A and 12B ends. However, another processing may be executed. For example, the CPU 154 may store, in the storage area such as the RAM 153, information representing that return from the power saving state is not permitted.

Processing B shown in FIGS. 12A and 12B will be described next.

In step S1206, the CPU 103 of the information processing apparatus 101 writes an operation request command in the characteristic of the short distance wireless communication unit 157 via the short distance wireless communication unit 110.

In step S1207, the CPU 201 of the short distance wireless communication unit 157 transmits, to the CPU 154 of the communication apparatus 151, the handle number of the characteristic in which write has been done in step S1206. Transmission may be implemented by an interrupt to the CPU 154 or polling of the state of the short distance wireless communication unit 157 by the CPU 154.

In step S1208, the CPU 154 determines whether the handle number transmitted in step S1207 matches the handle number of the predetermined characteristic. The processing in step S1208 is the same as that in step S1203. If it is determined that the handle number transmitted in step S1207 does not match the handle number of the predetermined characteristic, the process advances to step S1209; otherwise, the above-described processes are performed from step S1204.

In step S1209, with respect to the characteristic associated with the handle number transmitted in step S1207, the CPU 154 determines, with reference to the table 901 shown in FIG. 9, whether it is necessary to return from the power saving state. In this embodiment, whether it is necessary to return from the power saving state is determined based on the handle number of the characteristic. However, the determination processing may be performed based on another condition. For example, the determination processing may be performed based on the handle number of the service or based on both the handle numbers of the service and the characteristic.

If it is determined in step S1209 that it is necessary to return from the power saving state, the process advances to step S1210; otherwise, the CPU 154 does not return the communication apparatus 151 from the power saving state in step S1213, and executes processing corresponding to the written operation request command in step S1212. After that, processing B ends.

If it is determined in step S1209 that it is necessary to return from the power saving state, the CPU 154 determines in step S1210 whether information indicating that return from the power saving state is permitted is stored in the storage area such as the RAM 153. If it is determined that the information indicating that return from the power saving state is permitted is stored, the CPU 154 returns the communication apparatus 151 from the power saving state to the normal power state in step S1211. Then, the CPU 154 executes, in step S1212, processing corresponding to the characteristic in which the operation request command has been written, and ends processing B. On the other hand, if it is determined in step S1210 that the information indicating that return from the power saving state is permitted is not stored, the CPU 154 does not return the communication apparatus 151 from the power saving state in step S1214, and ends processing B. In this case, processing corresponding to the characteristic in which the operation request command has been written is not executed. Note that after the information processing apparatus 101 executes write in the characteristic "apparatus name", if an operation request command is written in the characteristic in step S1206 after a predetermined time elapses, the information representing return from the power saving state is deleted (for example, the flag "1" is reset). In this case as well, it is determined in step S1210 that the information indicating that return from the power saving state is permitted is not stored.

As described above, according to this embodiment, if a predetermined condition is satisfied in a case that an operation request command is written, the communication apparatus 151 returns from the power saving state. The predetermined condition is that the characteristic as the write destination of the operation request command is an area for which it is necessary to return from the power saving state, and write is executed in the predetermined characteristic ("apparatus name" area) before the write of the operation request command. If the predetermined condition is not satisfied, even if the operation request command is written, the communication apparatus 151 does not return from the power saving state.

With this arrangement, if an unintended operation request command is written in the communication apparatus 151, for example, if an apparatus that is not approved to access the GATT data of the short distance wireless communication unit 157 writes an operation request command, the communication apparatus 151 does not return from the power saving state. As a result, it is possible to suppress unnecessary power consumption.

In this embodiment, it is determined in step S1204 whether the acquired value is a normal value or an abnormal value, and information representing that return from the power saving state is permitted is stored in the storage area in step S1205. However, whether the acquired value is a normal value or an abnormal value may be determined in a case that an operation request command is written. For example, if, in step S1210, the CPU 154 acquires the value in the "apparatus name" area, and determines that the acquired value is a normal value, the processing in step S1211 may be executed, and if it is determined that the acquired value is an abnormal value, the processing in step S1214 may be executed.

The information representing that return from the power saving state is permitted and stored in the storage area in step S1205 may be initialized by deletion or the like in a case that connection between the communication apparatus 151 and the information processing apparatus 101 is disconnected.

Third Embodiment

The third embodiment will be described below with respect to the difference from the first and second embodiments. FIGS. 14A to 14C are flowcharts illustrating return control processing from a power saving state of a communication apparatus 151 according to this embodiment.

Assume a case in which a table 901 shown in FIG. 9 is not held due to restriction of a memory. In this case, if an operation request command is written in a short distance wireless communication unit 157, the communication apparatus 151 is uniformly returned from the power saving state. For example, even if an unintended information processing apparatus 101 writes an operation request command, the communication apparatus 151 is returned from the power saving state, thereby unnecessarily consuming power.

In this embodiment, based on the fact that the information processing apparatus 101 writes, in advance, a value in a characteristic "apparatus name" of the short distance wireless communication unit 157, the communication apparatus 151 is returned from the power saving state. Then, processing corresponding to the characteristic in which the operation request command has been written is executed. With this arrangement, if the unintended information processing apparatus 101 writes the operation request command, the communication apparatus 151 is not returned from the power saving state. As a result, it is possible to suppress unnecessary power consumption.

The processing of the communication apparatus 151 shown in FIGS. 14A to 14C is implemented in a case that, for example, a CPU 154 loads a control program stored in a ROM 152 or an HDD (not shown) of the communication apparatus 151 into a RAM 153 and executes it. Furthermore, the processing of the information processing apparatus 101 shown in FIGS. 14A to 14C is implemented in a case that, for example, a CPU 103 loads a control program stored in a ROM 104 or an HDD (not shown) of the information processing apparatus 101 into a RAM 105 and executes it. In this embodiment, if processing A and processing B of FIGS. 14A to 14C are performed in this order, the communication apparatus 151 is returned from the power saving state. The processing shown in FIGS. 14A to 14C is performed in a state in which the information processing apparatus 101 and the communication apparatus 151 establish BLE connection and can perform data communication by the GATT communication method in S701 to S711.

In step S1401, the CPU 103 of the information processing apparatus 101 executes write in the characteristic "apparatus name" of GATT data constructed by the short distance wireless communication unit 157 with respect to the short distance wireless communication unit 157 via a short distance wireless communication unit 110. A value to be written may be a predetermined value such as "1", or a value capable of identifying the information processing apparatus 101. The characteristic "apparatus name" is an original characteristic area of a vendor.

In step S1402, a CPU 201 of the short distance wireless communication unit 157 notifies the CPU 154 of the communication apparatus 151 that write has been executed in the characteristic "apparatus name". The notification may be made by an interrupt to the CPU 154 or polling of the state of the short distance wireless communication unit 157 by the CPU 154.

In step S1403, the CPU 154 acquires the value written in the characteristic "apparatus name", and determines whether the acquired value is a normal value or an abnormal value. Based on, for example, whether the acquired value is a value in a data format shown in FIG. 13, the CPU 154 determines whether the acquired value is a normal value or an abnormal value. To determine whether the acquired value is a normal value or an abnormal value, another condition may be used. For example, a value input in advance to the communication apparatus 151 via an input interface 158 is compared with the value written in the predetermined characteristic, and if the values match, it may be determined that the acquired value is a normal value. In this case, a plurality of values may be input in advance to the communication apparatus 151 via the input interface 158. Alternatively, based on the fact that the value is written in the predetermined characteristic, it may be determined that the acquired value is a normal value. Alternatively, a data list may be stored in advance in the ROM 152, a value included in the data list may be compared with the value written in the predetermined characteristic, and then if the values match, it may be determined that the acquired value is a normal value. In the data list, for example, a list of pieces of identification information of apparatuses which have been approved to access the GATT data constructed by the short distance wireless communication unit 157 is described. The identification information may include, for example, the apparatus name, MAC address, and model number of the information processing apparatus 101. If it is determined in step S1403 that the acquired value is a normal value, the CPU 154 stores, in step S1404, information representing that return from the power saving state is permitted in a storage area such as the RAM 153 in the communication apparatus 151. This information may be, for example, a flag, and a flag indicating "1" is stored in the storage area. The CPU 154 monitors a time of "1" by a timer, and resets the flag to "0" in a case that a predetermined time elapses. The flag may be deleted in a case that the predetermined time elapses. If it is determined in step S1403 that the acquired value is an abnormal value, the CPU 154 may store, in step S1404, information representing that return from the power saving state is not permitted. After step S1404, processing A shown in FIGS. 14A to 14C ends.

Processing B shown in FIGS. 14A to 14C will be described next.

In step S1405, the CPU 103 of the information processing apparatus 101 writes an operation request command in the characteristic of the short distance wireless communication unit 157 via the short distance wireless communication unit 110.

In step S1406, the CPU 201 of the short distance wireless communication unit 157 notifies the CPU 154 of the communication apparatus 151 that the operation request command has been written in the characteristic. As a method of notifying that the operation request command has been written, the notification may be made by an interrupt to the CPU 154 or polling of the state of the short distance wireless communication unit 157 by the CPU 154.

In step S1407, the CPU 154 determines whether information representing that return from the power saving state is permitted is stored in the storage area such as the RAM 153. If it is determined that the information representing that return from the power saving state is permitted is stored, the CPU 154 returns the communication apparatus 151 from the power saving state in step S1408. Then, the CPU 154 executes, in step S1409, processing corresponding to the characteristic in which the operation request command has been written, and ends processing B. On the other hand, if it is determined in step S1407 that the information representing that return from the power saving state is permitted is not stored, the CPU 154 does not return the communication apparatus 151 from the power saving state in step S1410, and ends processing B. In this case, processing corresponding to the characteristic in which the operation request command has been written is not executed.

With this arrangement, if an unintended operation request command is written in the communication apparatus 151, for example, if an apparatus that is not approved to access the GATT data constructed in the short distance wireless communication unit 157 writes an operation request command, the communication apparatus 151 does not return from the power saving state. As a result, it is possible to suppress unnecessary power consumption.

In this embodiment, it is determined in step S1403 whether the acquired value is a normal value or an abnormal value, and information representing that return from the power saving state is permitted is stored in the storage area in step S1404. However, whether the acquired value is a normal value or an abnormal value may be determined in a case that an operation request command is written. For example, if, in step S1407, the CPU 154 acquires the value in the characteristic "apparatus name", and determines that the acquired value is a normal value, the processing in step S1408 may be executed, and if it is determined that the acquired value is an abnormal value, the processing in step S1410 may be executed.

As described above, according to this embodiment, based on the fact that the information processing apparatus 101 writes, in advance, a value in the characteristic "apparatus name" of the short distance wireless communication unit 157, the communication apparatus 151 is returned from the power saving state. With this arrangement, even in the arrangement in which there is no table 901 shown in FIG. 9, in a case that the unintended information processing apparatus 101 writes an operation request command, the communication apparatus 151 is not returned from the power saving state, and it is thus possible to suppress unnecessary power consumption. Furthermore, even if there are a number of operation request commands corresponding to processing for which it is necessary to return from the power saving state, the information processing apparatus 101 need only recognize the procedure of executing write in the characteristic "apparatus name". That is, it is unnecessary to store data in the nonvolatile memory of the communication apparatus 151 or the like, it is possible to prevent the storage area from increasing. Even if the same operation request command is written, it is possible to switch whether to return from the power saving state, in accordance with the state of the information processing apparatus 101 or the transmission timing of the operation request command.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A communication apparatus comprising:
a first determination unit configured to determine, in a case that writing in predetermined data of the communication apparatus is executed by an information processing apparatus, whether an area in which the writing in the predetermined data of the communication apparatus is executed is a predetermined area in the predetermined data;
a second determination unit configured to determine, in a case that the writing in the predetermined data of the communication apparatus is executed by the information processing apparatus, whether data written in the predetermined data is data in a predetermined; and
a control unit configured to control, based on a result of the determination by the first determination unit, and a result of the determination by the second determination unit, whether to shift a state of the communication apparatus from a power saving state to a normal state in which power consumption is larger than in the power saving state,
wherein when the first determination unit determines that the area in which the writing in the predetermined data of the communication apparatus is executed is the predetermined area and the second determination unit determines that the data written in the predetermined data is the data in the predetermined format, the control unit shifts the state of the communication apparatus from the power saving state to the normal state, and when the first determination unit determines that the area in which the writing in the predetermined data of the communication apparatus is executed is not the predetermined area, or when the second determination unit determines that the data written in the predetermined data is not the data in the predetermined format, the control unit does not shift the state of the communication apparatus from the power saving state to the normal state.

2. The apparatus according to claim 1, wherein
when the first determination unit determines that the area in which the writing in the predetermined data of the communication apparatus is executed is the predetermined area, and the second determination unit determines that the data written in the predetermined data is the data in the predetermined format, and it is determined that a predetermined command is written in an area of the data different from the predetermined area in the data, the control unit shifts the state of the communication apparatus from the power saving state to the normal state, and
processing corresponding to the area in which the predetermined command is written is executed in the communication apparatus after the state of the communication apparatus is shifted from the power saving state to the normal state.

3. The apparatus according to claim 2, wherein the processing corresponding to the area in which the predetermined command is written includes at least one of processing of causing the communication apparatus to execute printing and processing of executing setting change of the communication apparatus.

4. The apparatus according to claim 2, wherein
when the first determination unit determines that the area in which the writing in the predetermined data of the communication apparatus is executed is the predetermined area, and the second determination unit determines that the data written in the predetermined data is the data in the predetermined format, and it is determined that the area in the data in which the predetermined command is written is a specific area of the data, the control unit shifts the state of the communication apparatus from the power saving state to the normal state,
when the first determination unit determines that the area in which the writing in the predetermined data of the communication apparatus is executed is the predetermined area, and the second determination unit determines that the data written in the predetermined data is the data in the predetermined format, and it is determined the area in the data in which the predetermined command is written is an area in the data different from the specific area, the control unit does not shift the state of the communication apparatus from the power saving state to the normal state,
when the first determination unit determines that the area in which the writing in the predetermined data of the communication apparatus is executed is the predetermined area, and the second determination unit determines that the data written in the predetermined data is the data in the predetermined format, and it is determined that the predetermined command is written in the specific area of the data, processing corresponding to the area in which the predetermined command is written is executed in the communication apparatus after the state of the communication apparatus is shifted from the power saving state to the normal state, and
when the first determination unit determines that the area in which the writing in the predetermined data of the communication apparatus is executed is the predetermined area, and the second determination unit determines that the data written in the predetermined data is the data in the predetermined format, and it is determined that the predetermined command is written in an area of the data different from the specific area in the data, processing corresponding to the area in which the predetermined command is written is executed in the communication apparatus without shifting the state of the communication apparatus from the power saving state to the normal state.

5. The apparatus according to claim 4, wherein
the processing corresponding to the specific area in which the predetermined command is written includes processing of causing the communication apparatus to execute printing, and
the processing corresponding to the area different from the specific area in which the predetermined command is written includes processing of executing setting change of the communication apparatus.

6. The apparatus according to claim 2, wherein when the first determination unit determines that the area in which the writing in the predetermined data of the communication apparatus is executed is not the predetermined area, or when the second determination unit determines that the data written in the predetermined data is not the data in the predetermined format and the predetermined command is written in the area of the data different from the predetermined area in the data, the control unit does not shift the state of the communication apparatus from the power saving state to the normal state.

7. The apparatus according to claim 1, wherein the predetermined area is an area in which identification information of the information processing apparatus is written.

8. The apparatus according to claim 1, wherein the data is Generic Attribute Profile (GATT) data.

9. The apparatus according to claim 8, wherein the predetermined area is an area corresponding to at least one of a service and a characteristic of the GATT data.

10. The apparatus according to claim 1, further comprising a print unit configured to execute printing.

11. The apparatus according to claim 1, wherein the power saving state is a state in which no power is supplied to at least some of components of the communication apparatus, which are supplied with power in the normal state.

12. The apparatus according to claim 11, wherein
the power saving state is a state in which power is supplied to a memory in the communication apparatus but no power is supplied to a print engine in the communication apparatus, and
the normal state is a state in which power is supplied to the memory in the communication apparatus and the print engine in the communication apparatus.

13. The apparatus according to claim 1, wherein write in the data is executed by Bluetooth Low Energy (BLE).

14. A control method of controlling a communication apparatus, the method comprising:
a first determination step of determining, in a case that writing in predetermined data of the communication apparatus is executed by an information processing apparatus, whether an area in which the writing in the predetermined data of the communication apparatus is executed is a predetermined area in the predetermined data;
a second determination step of determining, in a case that writing in the predetermine data of the communication apparatus is executed by the information processing apparatus, whether data written in the predetermined data is data in a predetermined format; and
a control step of controlling, based on a result of the determination by the first determination step, and a result of the determination by the second determination step, whether to shift a state of the communication apparatus from a power saving state to a normal state in which power consumption is larger than in the power saving state, wherein when the first determination step determines that the area in which the writing in the predetermined data of the communication apparatus is executed is the predetermined area and the second determination step determines that the data written in the predetermined area is the data in the predetermined format, the control step controls to shift the state of the communication apparatus from the power saving state to the normal state, and when the first determination step determines that the area in which the writing in the predetermined data of the communication apparatus is executed is not the predetermined area, or when the second determination step determines that the data written in the predetermined data is not the data in the predetermined format, the control step controls to not shift the state of the communication apparatus from the power saving state to the normal state.

15. A non-transitory computer-readable storage medium storing a program for causing a computer processor of a communication apparatus to function to execute:

a first determination step of determining, in a case that writing in predetermined data of the communication apparatus is executed by an information processing apparatus, whether an area in which the writing in the predetermined data of the communication apparatus is executed is a predetermined area in the predetermined data;

a second determination step of determining, in a case that the writing in the predetermined data of the communication apparatus is executed by the information processing apparatus, whether data written in the predetermined data is data in a predetermined format; and a control step of controlling, based on a result of the determination by the first determination step and a result of the determination by the second determination step, whether to shift a state of the communication apparatus from a power saving state to a normal state in which power consumption is larger than in the power saving state, wherein when the first determination step determines that the area in which the writing in the predetermined data of the communication apparatus is executed is the predetermined area and the second determination step determines that the data written in the predetermined data is the data in the predetermined format, the control step controls to shift the state of the communication apparatus from the power saving state to the normal state, and when the first determination step determines that the area in which the writing in the predetermined data of the communication apparatus is executed is not the predetermined area, or when the second determination step determines that the data written in the predetermined data is not the data in the predetermined format, the control step controls to not shift the state of the communication apparatus from the power saving state to the normal state.

16. The apparatus according to claim 1, further comprising:

a storing unit configured to store, if it is determined that the area in which a first writing in the predetermined data of the communication apparatus is executed is the predetermined area and if it is determined that the data, in the first writing, written in the predetermined data is the data in the predetermined format, information representing that a shift from the power saving state to the normal state is permitted in a memory in the information processing apparatus, if a second writing in the predetermined data of the communication apparatus is executed in a state that the information representing that the shift from the power saving state to the normal state is permitted is stored in the memory, based on a determination that the area in which the second writing in the predetermined data of the communication apparatus is executed is the predetermined area and it is determined that the data, in the second writing, written in the predetermined data is the data in the predetermined format, the control unit shifts the state of the communication apparatus from the power saving state to the normal state.

17. The apparatus according to claim 16, wherein the information representing that the shift from the power saving state to the normal state is permitted is deleted from the memory after a predetermined time elapses.

* * * * *